US010387310B2

(12) United States Patent
Retter et al.

(10) Patent No.: US 10,387,310 B2
(45) Date of Patent: Aug. 20, 2019

(54) REMOTE NODE BROADCAST OF REQUESTS IN A MULTINODE DATA PROCESSING SYSTEM

(71) Applicant: INTERNATIONAL BUSINESS MACHINES CORPORATION, Armonk, NY (US)

(72) Inventors: Eric E. Retter, Austin, TX (US); Michael S. Siegel, Raleigh, NC (US); Jeffrey A. Stuecheli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/873,515

(22) Filed: Jan. 17, 2018

(65) Prior Publication Data
US 2019/0220408 A1     Jul. 18, 2019

(51) Int. Cl.
G06F 12/00      (2006.01)
G06F 12/0817    (2016.01)
G06F 12/0831    (2016.01)
G06F 12/0811    (2016.01)

(52) U.S. Cl.
CPC ...... *G06F 12/0817* (2013.01); *G06F 12/0833* (2013.01); *G06F 12/0811* (2013.01)

(58) Field of Classification Search
None
See application file for complete search history.

(56) References Cited

U.S. PATENT DOCUMENTS

| 5,895,484 A  | 4/1999 | Arimilli et al. |
| 6,067,603 A  | 5/2000 | Carpenter et al. |
| 6,067,611 A  | 5/2000 | Carpenter et al. |
| 6,081,874 A  | 6/2000 | Carpenter et al. |
| 6,108,764 A  | 8/2000 | Baumgartner et al. |
| 6,115,804 A  | 9/2000 | Carpenter et al. |
| 6,122,674 A  | 9/2000 | Olnowich |
| 6,338,122 B1 | 1/2002 | Baumgartner et al. |
| 6,546,429 B1 | 4/2003 | Baumgartner et al. |

(Continued)

OTHER PUBLICATIONS

Guy Guthrie et al., U.S. Appl. No. 15/873,366, filed Jan. 17, 2018—Non-Final Office Action dated Apr. 5, 2019.

*Primary Examiner* — Sean D Rossiter
(74) *Attorney, Agent, or Firm* — Brian F. Russell; Bryan Bortnick

(57) ABSTRACT

A data processing system includes first and second coherency domains and employs a snoop-based coherence protocol. In response to receipt by the first coherency domain of a memory access request originating from a master in the second coherency domain, a plurality of coherence participants in the first coherency domain provides partial responses for the memory access request to an early combined response generator. Based on the partial responses, the early combined response generator generates and transmits, to a memory controller of a system memory in the first coherency domain, an early combined response of only the first coherency domain. Based on the early combined response, the memory controller transmits, to the master prior to receipt by the memory controller of a systemwide combined response for the memory access request, data associated with a target memory address and/or coherence permission for the target memory address.

18 Claims, 16 Drawing Sheets

(56) References Cited

U.S. PATENT DOCUMENTS

| | | |
|---|---|---|
| 6,591,307 B1 | 7/2003 | Arimilli et al. |
| 6,611,872 B1 | 8/2003 | McCanne |
| 6,615,322 B2 | 9/2003 | Arimilli et al. |
| 6,633,959 B2 | 10/2003 | Arimilli et al. |
| 6,711,652 B2 | 3/2004 | Arimilli et al. |
| 7,444,494 B2 | 10/2008 | Goodman et al. |
| 7,818,388 B2 | 10/2010 | Arimilli et al. |
| 8,140,770 B2 | 3/2012 | Clark et al. |
| 8,775,906 B2 | 7/2014 | Dodson et al. |
| 9,058,273 B1* | 6/2015 | Hollaway, Jr. ...... G06F 12/0831 |
| 9,176,877 B2 | 11/2015 | Holloway, Jr. et al. |
| 2003/0009623 A1 | 1/2003 | Arimilli et al. |
| 2004/0230750 A1 | 11/2004 | Blake et al. |
| 2005/0160226 A1 | 7/2005 | Averill et al. |
| 2006/0179244 A1* | 8/2006 | Goodman ........... G06F 12/0817 711/141 |
| 2006/0200633 A1* | 9/2006 | Hosoe ................. G06F 12/0835 711/146 |
| 2006/0271744 A1* | 11/2006 | Goodman ........... G06F 12/0833 711/141 |
| 2007/0150664 A1 | 6/2007 | Dombrowski et al. |
| 2007/0226427 A1* | 9/2007 | Guthrie ............... G06F 12/0831 711/146 |
| 2009/0198918 A1 | 8/2009 | Arimilli et al. |
| 2010/0235577 A1 | 9/2010 | Guthrie et al. |
| 2011/0047352 A1 | 2/2011 | Ganfield et al. |
| 2012/0278431 A1* | 11/2012 | Luna .................... G06F 9/5027 709/217 |
| 2013/0205096 A1 | 8/2013 | Guthrie et al. |
| 2014/0115267 A1* | 4/2014 | Pierson ............... H04L 63/0263 711/141 |
| 2014/0250276 A1* | 9/2014 | Blaner ................. G06F 12/0831 711/146 |

* cited by examiner

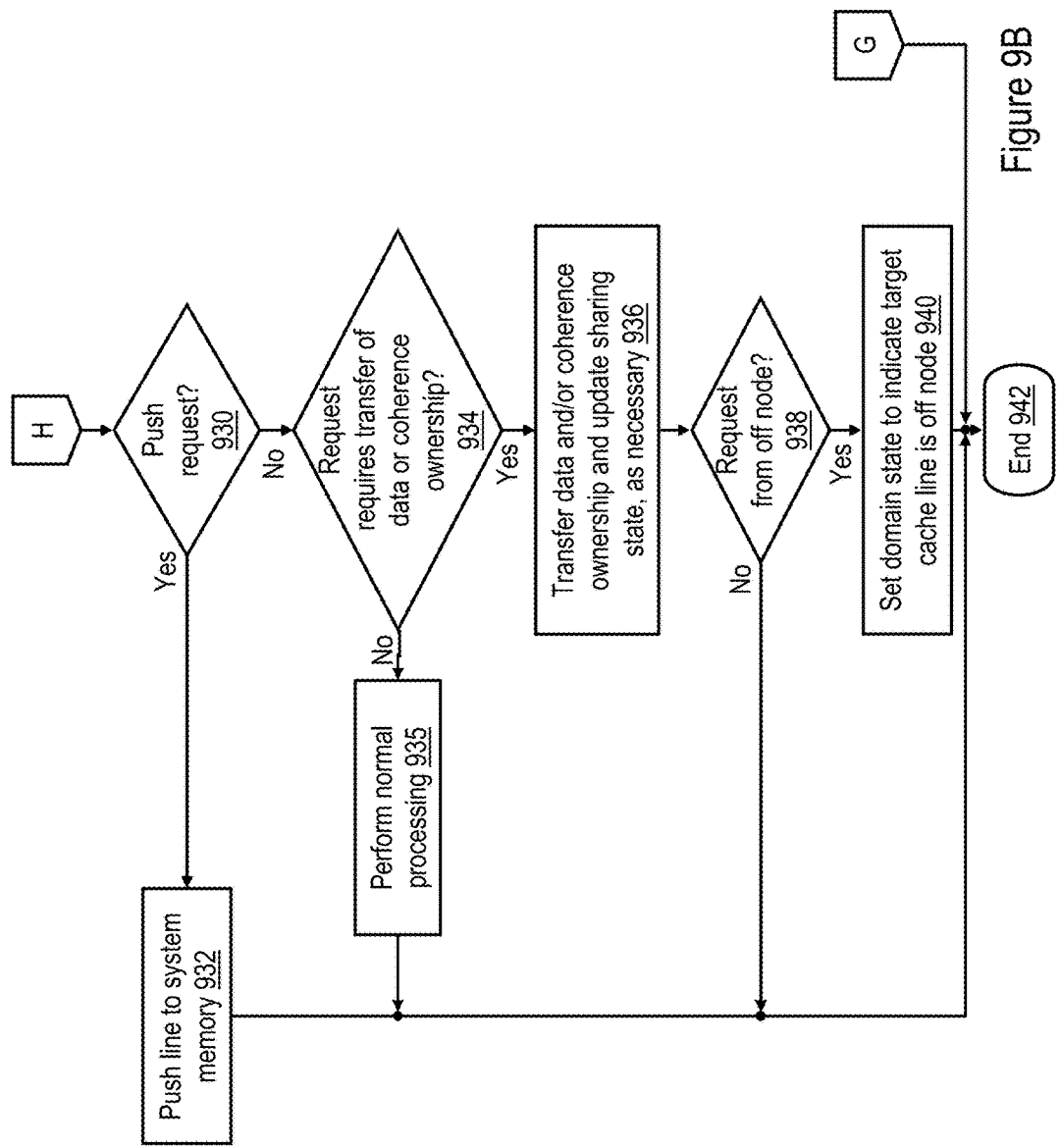

REMOTE NODE BROADCAST OF REQUESTS IN A MULTINODE DATA PROCESSING SYSTEM

BACKGROUND

The present invention relates in general to data processing and, in particular, to data processing in cache coherent data processing systems.

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines of each cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

Cache coherency protocols have generally, with some exceptions, assumed that to maintain cache coherency a global broadcast of coherency messages had to be employed. That is, that all coherency messages must be received by all cache hierarchies in an SMP computer system. At least one protocol has improved system scalability by allowing coherency messages, in certain cases, to be restricted to a local scope including the cache hierarchy of a requesting processor core and those of adjacent processor cores in the same processing node.

BRIEF SUMMARY

According to one embodiment, a data processing system includes first and second coherency domains and employs a snoop-based coherence protocol. In response to receipt by the first coherency domain of a memory access request originating from a master in the second coherency domain, a plurality of coherence participants in the first coherency domain provides partial responses for the memory access request to an early combined response generator. Based on the partial responses, the early combined response generator generates and transmits, to a memory controller of a system memory in the first coherency domain, an early combined response of only the first coherency domain. Based on the early combined response, the memory controller transmits, to the master prior to receipt by the memory controller of a systemwide combined response for the memory access request, data associated with a target memory address and/or coherence permission for the target memory address.

BRIEF DESCRIPTION OF THE SEVERAL VIEWS OF THE DRAWINGS

FIGS. 9A-9B together depict a high level logical flowchart of an exemplary process by which a lower level cache memory (e.g., L2 cache) handles a request snooped on the interconnect fabric of a data processing system in accordance with one embodiment;

DETAILED DESCRIPTION

Figure 1:
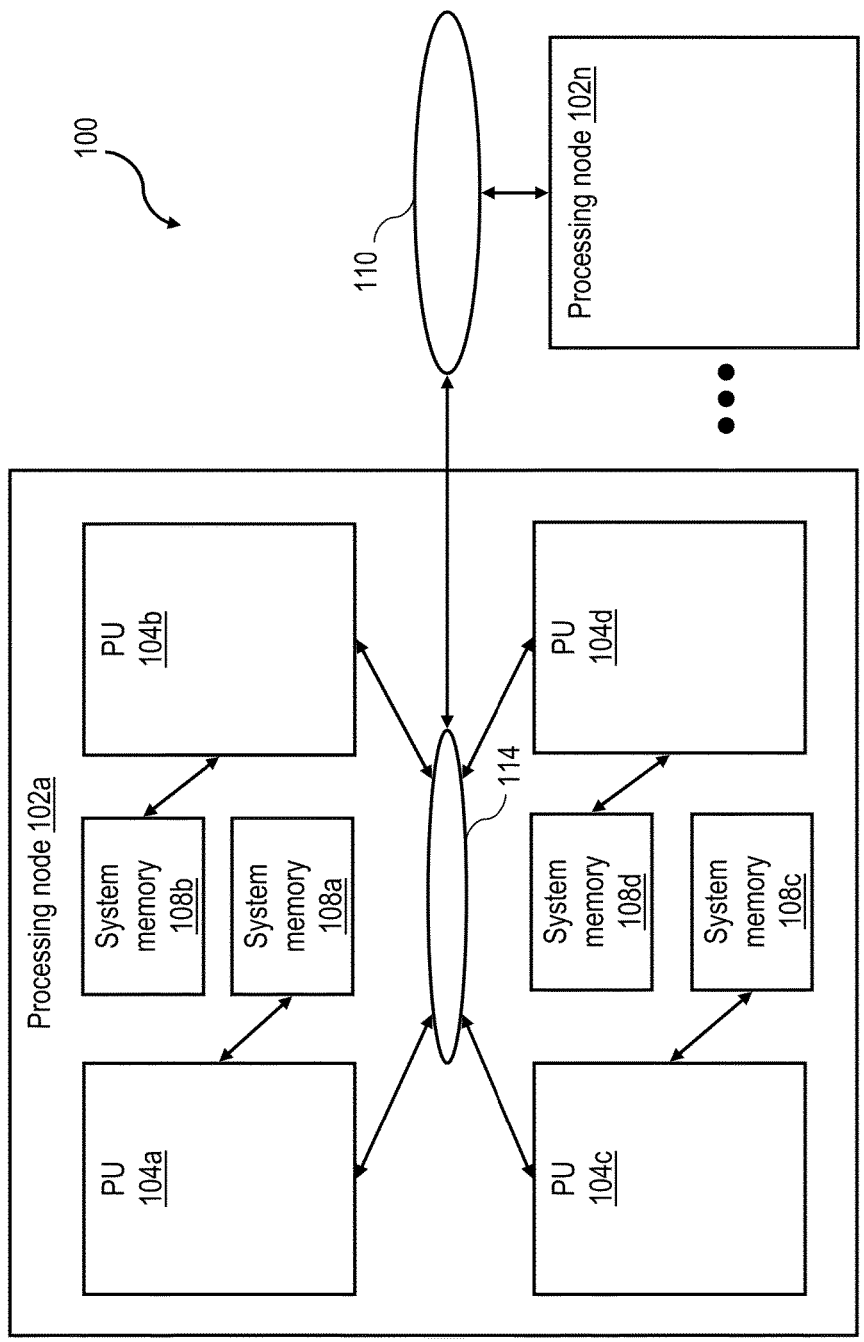
FIG. 1 is a high level block diagram of an exemplary cache coherent data processing system that employs a snoop-based coherence protocol in accordance with one embodiment.

With reference now to the figures and, in particular, with reference to FIG. 1, there is illustrated a high level block diagram of an exemplary embodiment of a cache coherent symmetric multiprocessor (SMP) data processing system that employs a snoop-based coherence protocol in accordance with one embodiment. As shown, data processing system 100 includes multiple processing nodes 102a-102n for processing data and instructions. Processing nodes 102a-102n are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit chip including a substrate on which integrated circuit is formed as is known in the art. The processing units 104a-104d within each processing node 102 are coupled for communication by a local interconnect 114, which, like system interconnect 110, may be implemented with one or more buses and/or switches. System interconnect 110 and local interconnects 114 collectively form an interconnect fabric.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
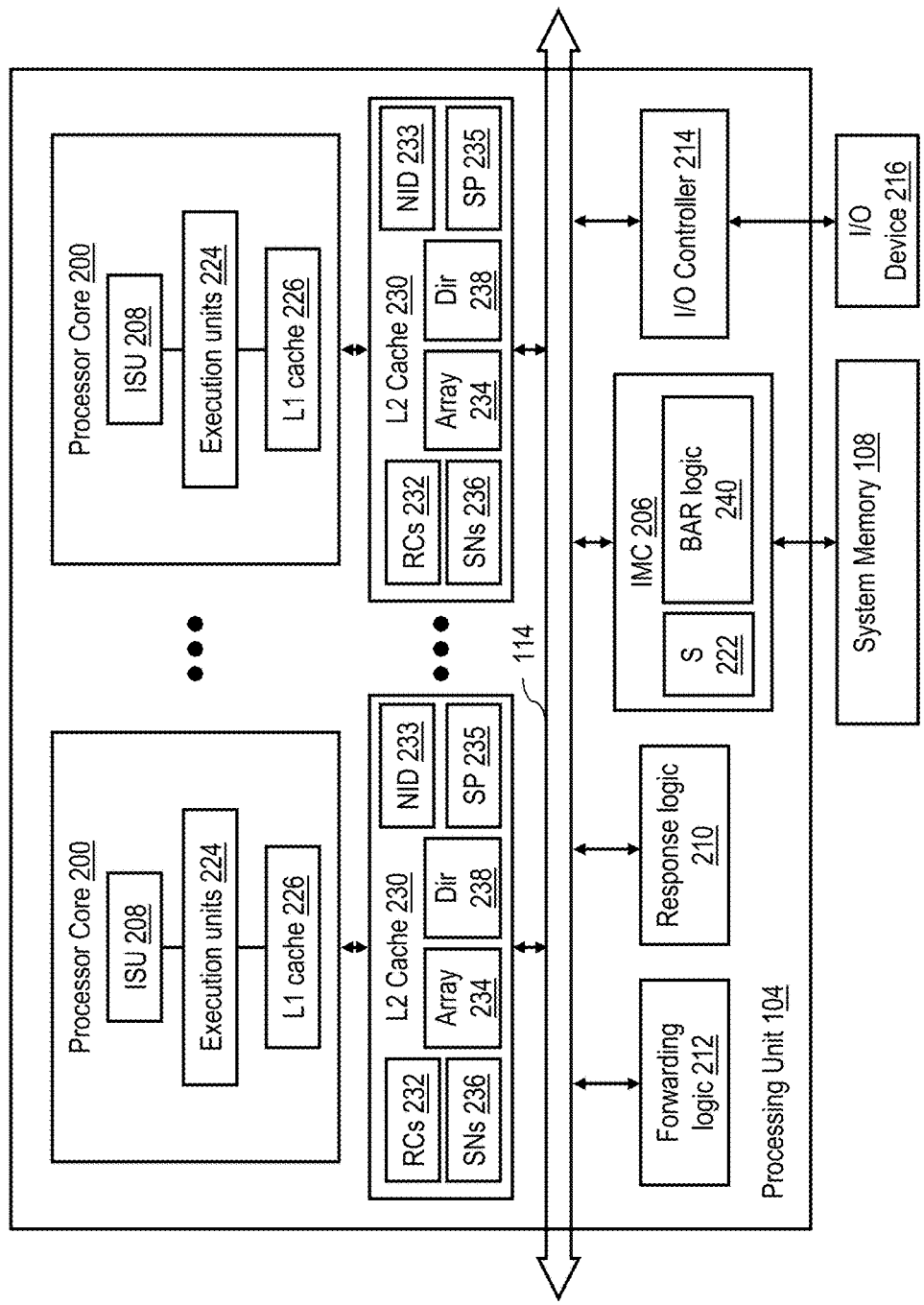
FIG. 2 is a more detailed block diagram of a processing unit within the data processing system of FIG. 1 in accordance with one embodiment.

Referring now to FIG. 2, there is depicted a more detailed block diagram of an exemplary processing unit 104 in accordance with one embodiment. In the depicted embodiment, each processing unit 104 includes multiple processor cores 200 for independently processing instructions and data. In a preferred embodiment, each processor core 200 supports simultaneous multithreading (SMT) and thus is capable of independently executing multiple hardware threads of execution simultaneously. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to processor and I/O requests on the local interconnect 114. IMC 206 includes one or more snoopers 222 for servicing snooped requests and base address register (BAR) logic 240 by which IMC 206 determines the real addresses that are assigned to storage locations in its system memory 108 (and thus the real addresses for which IMC 206 is responsible).

In the illustrative embodiment, the cache memory hierarchy of processing unit 104 includes a private store-through level one (L1) cache 226 within each processor core 200 as well as a private store-in level two (L2) cache 230. L2 cache 230 includes a set associative L2 array 234 for caching memory blocks corresponding to storage locations in system memories 108, a directory 238 of the contents of array 234, a set of read-claim (RC) machines 232 that, inter alia, initiates memory access and other requests on the interconnect fabric on behalf of the associated processor core 200, and a set of snoop (SN) machines 236 that participates in servicing memory access requests snooped on the interconnect fabric. In doing so, a SN machine 236 may provide appropriate coherence message(s) and perform any accesses to L2 array 234 and directory 238 required by the requests.

L2 cache 230 additionally includes node identification (ND) logic 233. NID logic 233, at a minimum, indicates the identity of the processing node 102 to which L2 cache 230 belongs. In a preferred embodiment, NID logic 233 may be implemented with BAR logic or a data structure that further indicates, based on a subset of real address bits, which processing node 102 contains the system memory 108 to which any real address is assigned (i.e., the "home node" of the read address). L2 cache 230 also includes scope prediction (SP) logic 235, which selects the scopes of broadcast of interconnect operations initiated by the RC machines 232 of the L2 cache 230. In various embodiments, the initial scope selected for an interconnect operation by SP logic 235 can be based on one or more factors, including the transaction type of the operation, the target real address of the operation, historical success/failure of prior operations in servicing a request utilizing a given scope, and/or the home node for the target real address of the interconnection operation as indicated by NID logic 233.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an instance of response logic 210, which, as discussed further below, implements a portion of the distributed snoop-based coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
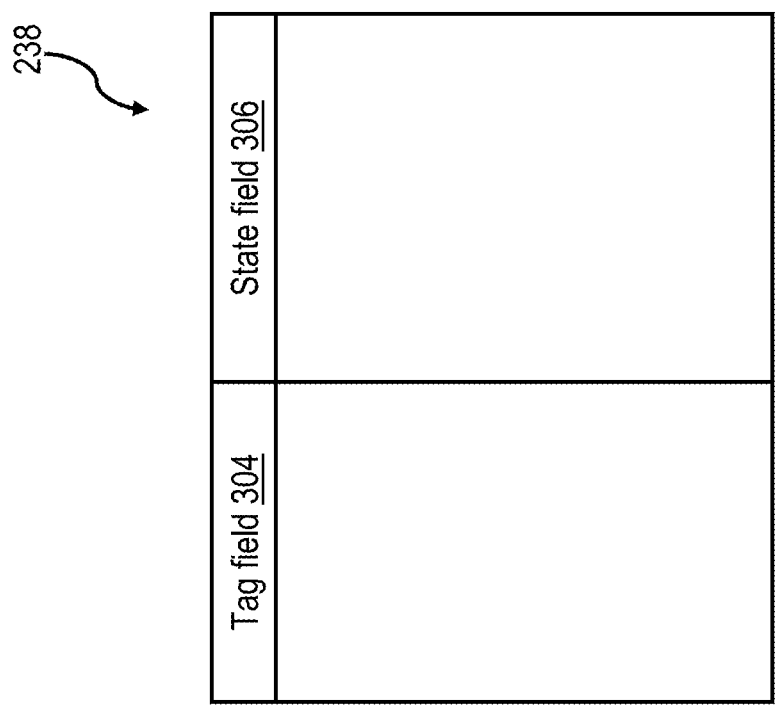
FIG. 3 is a more detailed block diagram of the L2 directory depicted in FIG. 2.

With reference now to FIG. 3, there is illustrated a more detailed block diagram of an exemplary embodiment of L2 directory 238. As in conventional set associative caches, memory locations in system memories 108 are mapped to particular congruence classes within cache arrays 234 utilizing predetermined index bits within the system memory (real) addresses. The particular cache lines stored within cache array 234 are recorded in cache directory 238, which contains one directory entry for each cache line in cache array 234. As understood by those skilled in the art, each directory entry in L2 directory 238 comprises at least a tag field 304, which specifies the particular cache line stored in cache array 234 utilizing a tag portion of the corresponding real address, and a state field 306, which indicates the cache state of the cache line. As utilized herein, the term "cache state" includes (1) a sharing state providing information regarding the sharing (or non-sharing) of the associated cache line among caches within data processing system 100 and/or (2) a domain state providing information regarding the coherence domain(s) in which the associated cache line is then cached (or may possibly be cached).

Figure 4A:
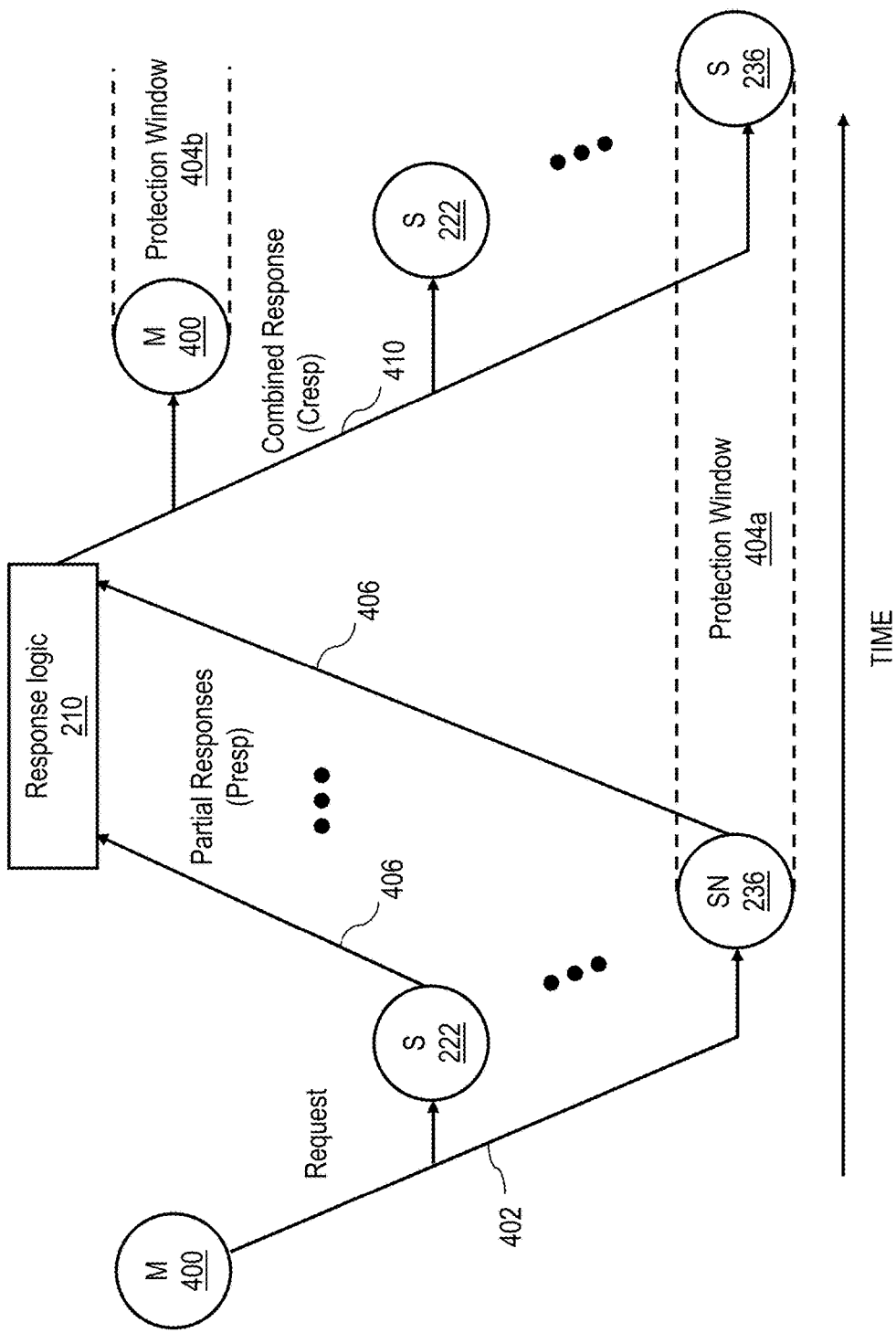
FIG. 4A is a time-space diagram of an exemplary transaction on the interconnect fabric of the data processing system of FIG. 1.

Referring now to FIG. 4A, there is depicted a time-space diagram of an exemplary interconnect operation on a local or system interconnect 110, 114 of data processing system 100 of FIG. 1. The operation begins when a master 400, such as an RC machine 232 of an L2 cache 230 (or another master, such as an I/O controller 214) issues a request 402 on a local interconnect 114 and/or system interconnect 110 of data processing system 100. Request 402 preferably includes a transaction type indicating a type of desired access and a resource identifier (e.g., target real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests destruction of all cached copies of a memory block and authority to update the memory block in system memory |

Request 402 is received by the SN machines 236 of L2 caches 230, as well as the snoopers 222 of memory controllers 206 (FIG. 1). In general, with some exceptions, the SN machines 236 in the same L2 cache 230 as an RC machine 232 that initiates a request 402 do not snoop that request 402 (i.e., there is generally no self-snooping) because a request 402 is transmitted on local interconnect 114 and/or system interconnect 110 only if the request 402 cannot be serviced internally by a processing unit 104. Snoopers 222 or SN machines 236 that receive request 402 may provide a respective partial response (Presp) 406 representing the response of at least that snooper to request 402. A snooper 222 within a memory controller 206 determines the partial response 406 to provide based, for example, on whether BAR logic 240 indicates the memory controller 206 is responsible for the request address and whether snooper 222 has resources available to service the request. An L2 cache 230 may determine its partial response 406 based on, for example, the availability of its L2 directory 238, the availability of a resources to handle the request (including an available SN machine 236), and the cache state associated with the request address in L2 directory 238.

The partial responses of snoopers 222 and 236 are logically combined either in stages or all at once by one or more instances of response logic 210 to determine a system-wide combined response (Cresp) 410 to request 402. Subject to the scope restrictions discussed below, response logic 210 provides combined response 410 to master 400 and snoopers 222, 236 via its local interconnect 114 and/or system interconnect 110 to indicate the system-wide response (e.g., Success, Retry, etc.) to request 402. If combined response 410 indicates success of request 402, combined response 410 may indicate, for example, a data source for a requested memory block, a cache state in which the requested memory block is to be cached by master 400, and whether "cleanup" operations invalidating the requested memory block in one or more caches 226, 230 are required.

In response to receipt of combined response 410, one or more of master 400 and snoopers 222, 236 typically perform one or more operations in order to service request 402. These operations may include supplying data to master 400, invalidating or otherwise updating the cache state of data cached in one or more L2 caches 230, performing castout operations, writing back data to a system memory 108, etc. As discussed further below, if required by request 402, a requested or target memory block may be transmitted to or from master 400 before or after the generation of combined response 410 by response logic 210.

The partial response provided by a snooper 222, 236 in response to a request and the operations performed the snooper in response to the request and/or its combined response will be described with reference to whether that snooper is a Highest Point of Coherency (HPC), a Lowest Point of Coherency (LPC), or neither with respect to the target address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 serving as a repository for the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a shared copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache state(s) within the L2 directory 238 of an L2 cache 230, as described further below with reference to Table II.

Still referring to FIG. 4A, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4A, the snooper 236 that is the HPC for the memory block specified by the request address of request 402 protects the transfer of ownership of the requested memory block to master 400 during a protection window 404a that extends at least from the time that snooper 236 determines its partial response 406 until snooper 236 receives combined response 410 (and possibly thereafter). During protection window 404a, snooper 236 protects the transfer of ownership by providing partial responses 406 (e.g., Retry Presps) to other requests specifying the same request address that prevent other masters from obtaining ownership until ownership has been successfully transferred to master 400. Master 400 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding combined responses are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with one or more partial responses (e.g., LPC_Ack and Retry) indicating that is the LPC for the memory block, but is unable to currently service the request.

Similarly, an L2 cache 230 may require an available SN machine 236 and access to L2 directory 302 in order to handle a snooped request 402. Absence of access to either (or both) of these resources results in a partial response (and corresponding CR) signaling an inability to service the request due to absence of a required resource (e.g., a Retry).

Figure 4B:
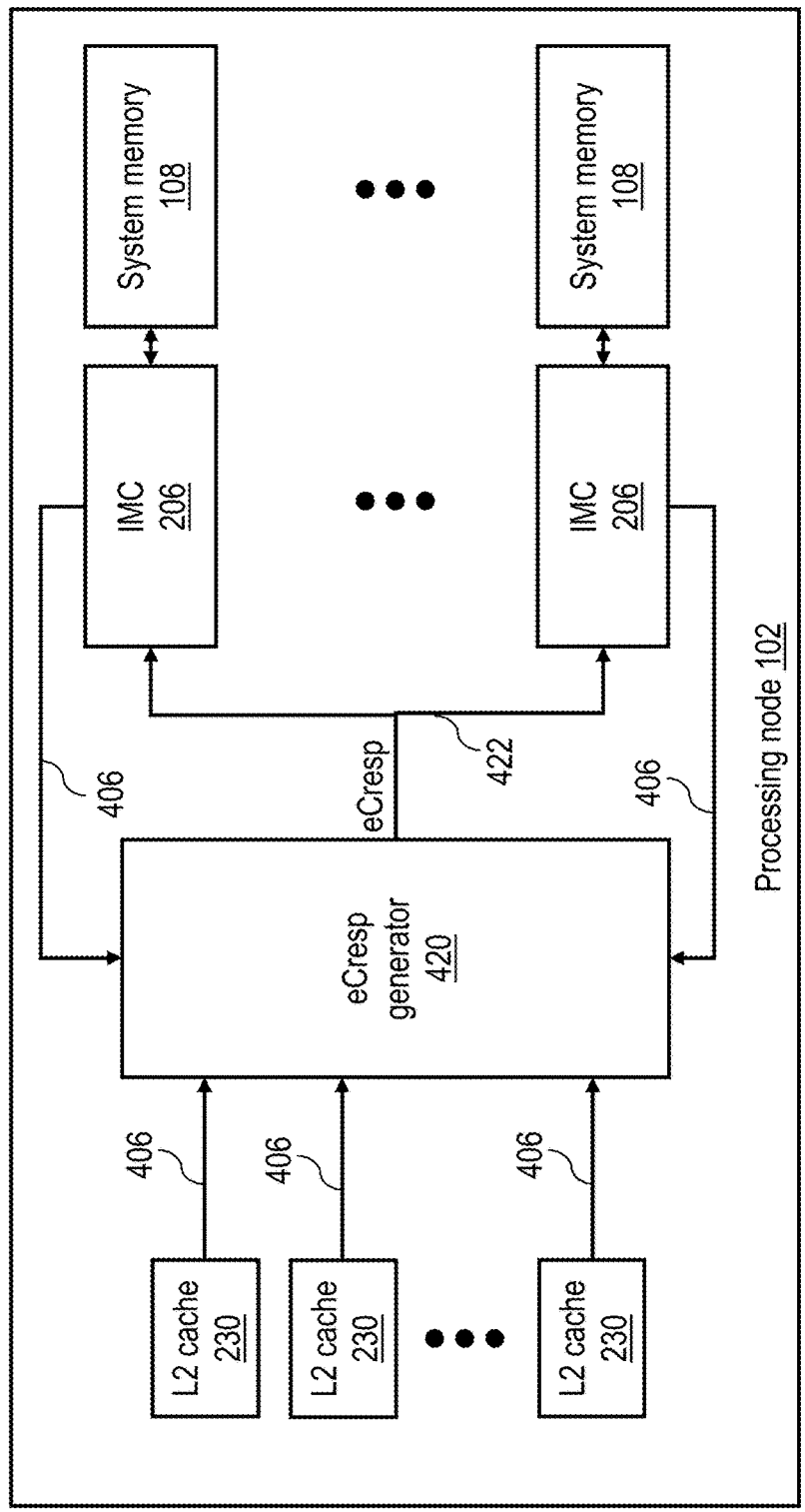
FIG. 4B is a block diagram of circuitry that generates an early nodal combined response in accordance with one embodiment.

Referring now to FIG. 4B, there is illustrated an embodiment of circuitry that can be implemented in each processing node 102 in order to generate a partial combined response of that processing node 102. To distinguish this partial combined response from the systemwide combined response (Cresp) described with reference to FIG. 4A, the per-node partial combined response is referred to herein as an "early" combined response (eCresp), reflecting that, in this embodiment, each processing node 102 will generate its own respective partial combined response prior to generation of the full systemwide Cresp. As can be seen by comparison of FIG. 4B and FIGS. 1-2, FIG. 4B omits a number of the previously described components of a processing node 102 in order to avoid obscuring those relevant to generation of the eCresp, FIG. 4B illustrates that in response to snooping a request 402 broadcast on the interconnect fabric each L2 cache 230 and IMC 206 in the processing node 102 generates its respective partial response 406. In addition to being sent to the response logic 210 of the processing node 102 that initiated the request 402 (as shown in FIG. 4A), partial responses 406 are also transmitted to an eCresp generator 420 in the local processing node 102. In one embodiment, eCresp generator 420 can be implemented, for example, in one instance of response logic 210. If the eCresp generator 420 is in the home processing node 102 (i.e., the processing node 102 containing the home system memory 108) of the target address of the request 402, eCresp generator 420 logically combines the partial responses 406 of the L2 caches 230 and IMCs 206 to generate an eCresp, which can indicate whether or not early data and/or coherency permission should be provided to the requesting master 400 in advance of the combined response (Cresp) 410. It should be noted that because the eCresp has a different purpose from Cresp 410, the eCresp is independent of, and can be different than, Cresp 410.

As further shown in FIG. 4B, the eCresp generated by eCresp generator 420 in the home processing node 102 is distributed to all of the IMCs 206 in the home processing node 102 via an eCresp bus 422. As described further below with reference to FIG. 8A, for a request 402 originating from a remote processing node 102, the IMC 206 responsible for the target address of the request 402 can utilize the eCresp to determine whether or not to transmit data and/or coherency permission requested by the request 402 to the master 400 in advance of receipt of the systemwide Cresp. As a result, the latency experienced by the master 400 can be reduced by the interval between receipt by the IMC 206 of the locally generated eCresp and of the systemwide Cresp.

Conventional broadcast-based data processing systems handle both cache coherency and data delivery through broadcast communication, which in at least some conventional systems is globally transmitted on an interconnect fabric to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the interconnect fabric is multiplied, meaning that system cost rises sharply with system scale as more bandwidth is required for communication over the interconnect fabric. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce traffic volume while still maintaining a broadcast-based coherency mechanism, preferred embodiments of the present invention implement coherency domains, which can conveniently be (but are not required to be) implemented with each processing node 102 forming a separate coherency domain. For the purposes of the explaining exemplary operation of data processing system 100, it will hereafter be assumed that all coherency domains have boundaries defined by sets of one or more processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a READ operation to issue, then processing unit 104a may elect to first broadcast the READ operation to all coherence participants within its own coherency domain (e.g., processing node 102a), but not to coherence participants in other coherency domains (e.g., processing node 102n). A broadcast operation transmitted to only those coherence participants within the same coherency domain as the master of the operation is defined herein as a "local operation". If the local READ operation can be serviced within solely the coherency domain of processing unit 104a, then no further broadcast of the READ request need be or is performed. If, however, the partial responses and combined response to the local READ request indicate that the READ request cannot be serviced solely within the local coherency domain of processing node 102a, the scope of the broadcast may then be extended to include, in addition to the local coherency domain, one or more additional coherency domain(s).

Figure 5A:
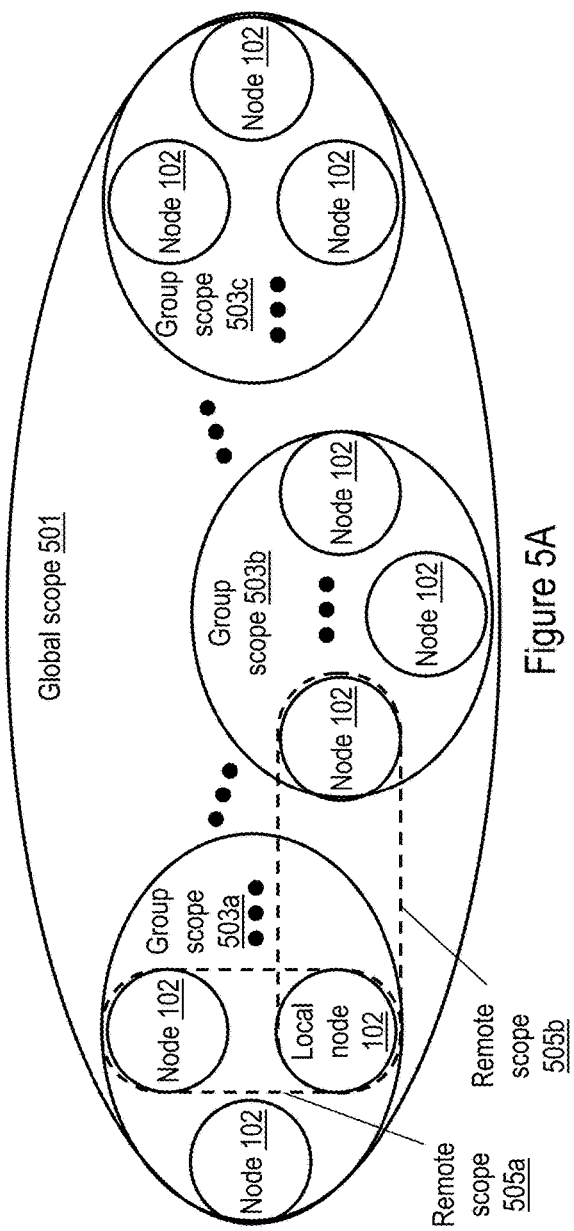
FIG. 5A depicts various scopes of operations on the interconnect fabric of the data processing system of FIG. 1.

In basic implementations, only two broadcast scopes are employed: a "local" scope including only the local coherency domain (e.g., a single processing node 102) and a "global" scope 501 including all of the coherency domains in the SMP data processing system, as shown in FIG. 5A. Thus, an operation that is transmitted to all coherency domains in an SMP data processing system is defined herein as a "global operation". Of course, one or more supersets of the local broadcast scope can be defined intermediate the local scope and the global scope. For example, FIG. 5A illustrates an embodiment in which data processing system 100 optionally implements a plurality of node groups, where an operation broadcast from one processing node 102 to all processing nodes 102 within the node group defines an operation of "group" scope (e.g., one of group scopes 503a, 505b or 503c).

In a preferred embodiment, the possible broadcast scopes for an operation are further expanded to include a "remote" scope, which is defined to include the local coherency domain (e.g., the local processing node 102) containing the master processing unit 104 that initiates the operation and a single other remote coherency domain (e.g., a remote processing node 102), while excluding at least one other peer coherency domain (e.g., a processing node 102 other than the local and remote processing nodes 102). It should be noted that the local coherency domain, the remote coherency domain, and the peer coherency domain are non-overlapping in scope. For example, FIG. 5A explicitly illustrates two of the possible remote scopes for local node 102, which are identified as remote scope 505a and remote scope 505b, respectively.

In a preferred embodiment, the scope of an operation is indicated within an interconnect operation by a scope indicator (signal). Forwarding logic 212 within processing units 104 preferably determines whether or not to forward an operation received via local interconnect 114 onto system interconnect 110 based upon the setting of the scope indicator (signal) in the interconnect operation.

Figure 5B:
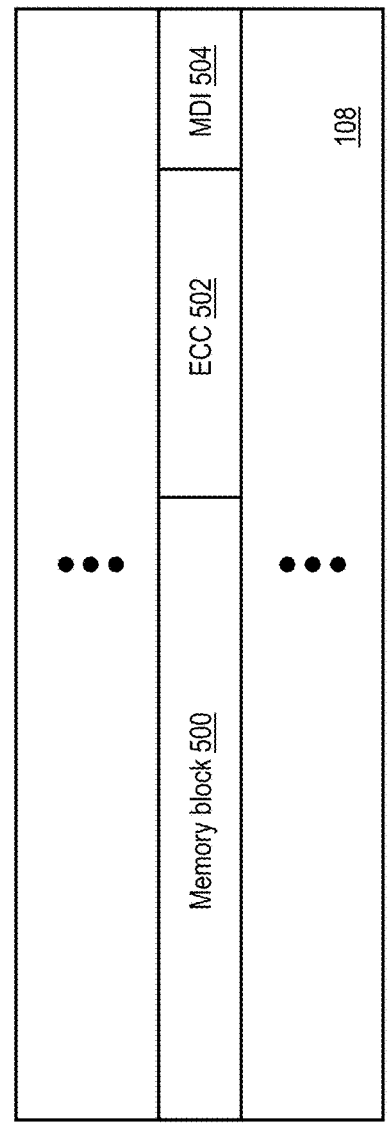
FIG. 5B illustrates a memory domain indicator (MDI) in accordance with one embodiment.

In order to limit the issuance of unneeded global operations and thereby reduce operational latency and conserve additional bandwidth on local interconnects, the present invention preferably implements a domain indicator per memory block that indicates whether or not a copy of the associated memory block may be cached outside of the local coherency domain. For example, FIG. 5B depicts an exemplary implementation of a domain indicator in accordance with one embodiment. As shown in FIG. 5B, a system memory 108, which may be implemented, for example, in dynamic random access memory (DRAM) static RAM, flash memory, or other memory technology, stores a plurality of memory blocks 500. System memory 108 stores in association with each memory block 500 an associated error correcting code (ECC) 502 utilized to correct errors, if any, in memory block 500 and a memory domain indicator (MDI) 504. Although in some embodiments of the present invention, domain indicator 504 may identify a particular coherency domain (i.e., specify a coherency domain or node ID), it is hereafter assumed that memory domain indicator (MDI) 504 is a 1-bit flag that is set (e.g., to '1' to indicate "local") if the associated memory block 500 is cached, if at all, only within the same coherency domain as the memory controller 206 serving as the LPC for the memory block 500. An MDI 504 is reset (e.g., to '0' to indicate "global") otherwise. The setting of MDI bits 504 to indicate "local" may be implemented imprecisely in that a false setting of "global" will not induce any coherency errors, but may cause unneeded global broadcasts of operations.

Importantly, memory controllers 206 that source a memory block in response to a request preferably transmit the associated MDI 504 in conjunction with the requested memory block. It should also be appreciated that a multiplicity of interconnect operations of various scopes can be "in flight" in data processing system 100 at any given time.

The present invention preferably implements a cache coherency protocol designed to leverage the implementation of coherency domains as described above. In a preferred embodiment, the cache states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache outside the local coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | U-nique? | Can allow cache to serve as data source? | Consistent with LPC? | Cached outside local domain? | Legal concurrent states |
|---|---|---|---|---|---|---|
| M | yes | yes | yes, before Cresp | no | no | I, Ig (& LPC) |
| Me | yes | yes | yes, before Cresp | yes | no | I, Ig (& LPC) |
| T | yes | unknown | yes, after Cresp if none provided before Cresp | no | unknown | Sr, S, I, Ig (& LPC) |
| Tn | yes | unknown | yes, after Cresp if none provided before Cresp | no | no | Sr, S, I, Ig (& LPC) |
| Te | yes | unknown | yes, after Cresp if none provided before Cresp | yes | unknown | Sr, S, I, Ig (& LPC) |
| Ten | yes | unknown | yes, after Cresp if none provided before Cresp | yes | no | Sr, S, I, Ig (& LPC) |
| Sr | no | unknown | yes, before CR | unknown | unknown | T, Tn, Te, Ten, S, I, Ig (& LPC) |

TABLE II-continued

| Cache state | HPC? | U-nique? | Can allow cache to serve as data source? | Consistent with LPC? | Cached outside local domain? | Legal concurrent states |
|---|---|---|---|---|---|---|
| S | no | unknown | no | unknown | unknown | T, Tn, Te, Ten, Sr, S, I, Ig (& LPC) |
| I | no | n/a | no | n/a | unknown | M, Me, T, Tn, Te, Ten, Sr, S, I, Ig (& LPC) |
| Ig | no | n/a | no | n/a | Assumed so, in absence of other information | M, Me, T, Tn, Te, Ten, Sr, S, I, Ig (& LPC) |

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain.

The Ig state is formed in a lower level cache in response to that cache providing a requested memory block to a requestor in another coherency domain in response to an exclusive access request (e.g., a bus RWITM operation). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency node in response to an exclusive access request.

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with the matching Ig entry as the selected victim. The cache thus avoids avoid placing two copies of the same address tag in the cache directory. Third, the castout of the Ig state is preferably performed as a local operation, or if performed by a remote master, is ignored by the LPC of the castout address. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is updated to "global" at the LPC (if local to the cache performing the castout).

Implementation of an Ig state in accordance with the present invention improves communication efficiency by maintaining a cached domain indicator for a memory block in a coherency domain even when no valid copy of the memory block remains cached in the coherency domain. As a consequence, an HPC for a memory block can service an exclusive access request (e.g., a snooped RWITM operation) from a remote coherency domain without retrying the request and performing a push of the requested memory block to the LPC.

With reference now generally to FIGS. 6A-11, several high level logical flowcharts depicting the logical steps involved in servicing requests of L2 caches 230 and I/O controllers 214 are given. Such operations (e.g., READ operations, WRITE operation, etc.) are termed "interconnect operations" herein to distinguish them from cache or CPU (processor) operations. As logical flowcharts, it should be understood that these figures are not intended to convey a strict chronology of operations and that many of the illustrated operations may be performed concurrently or in a different order than that shown.

Figure 6A:
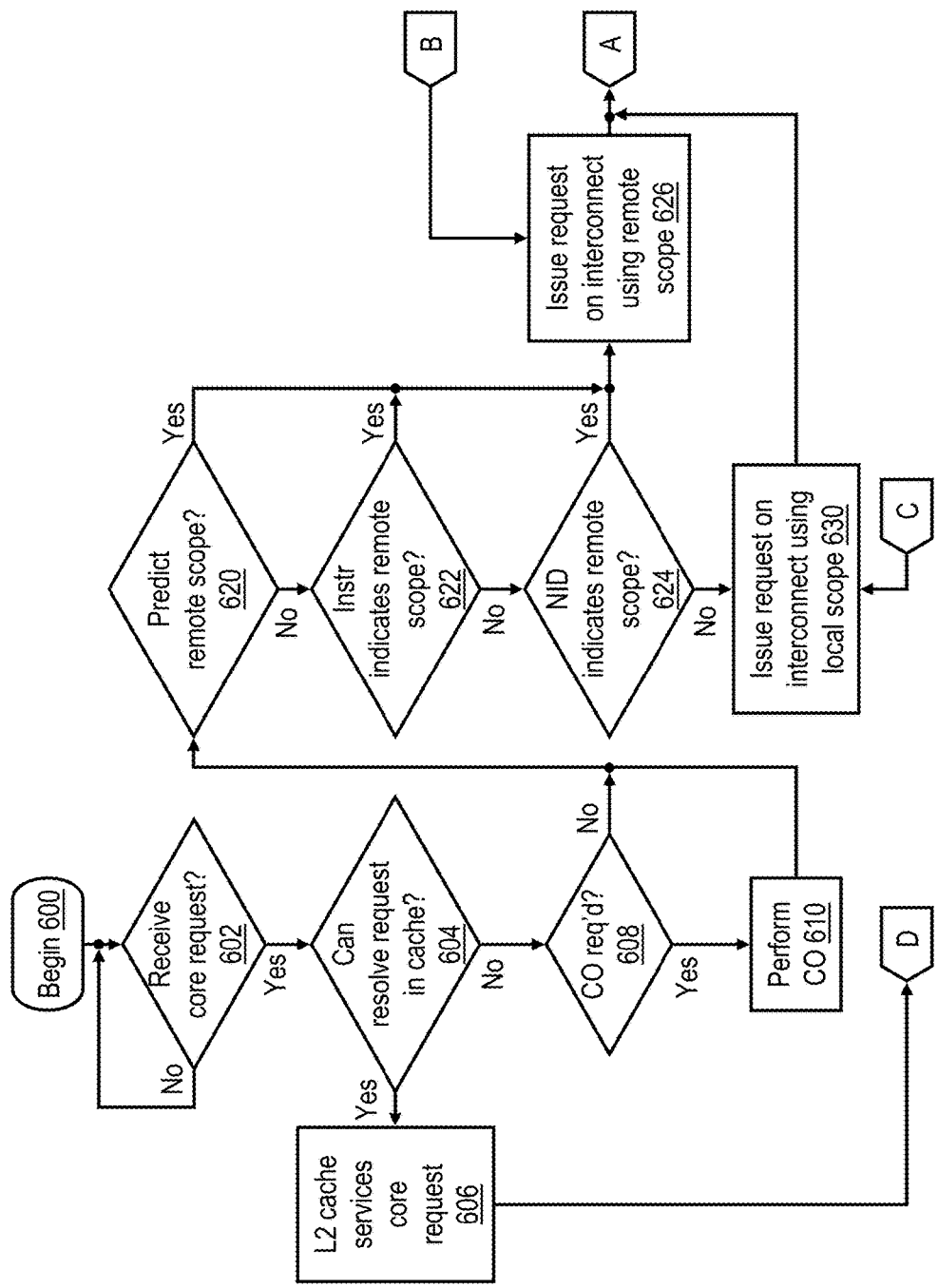
FIGS. 6A-6B together depict a high level logical flowchart of an exemplary process by which a lower level cache memory (e.g., L2 cache) of a data processing system issues memory access requests on a interconnect fabric using various broadcast scopes in accordance with one embodiment.
Figure 6B:
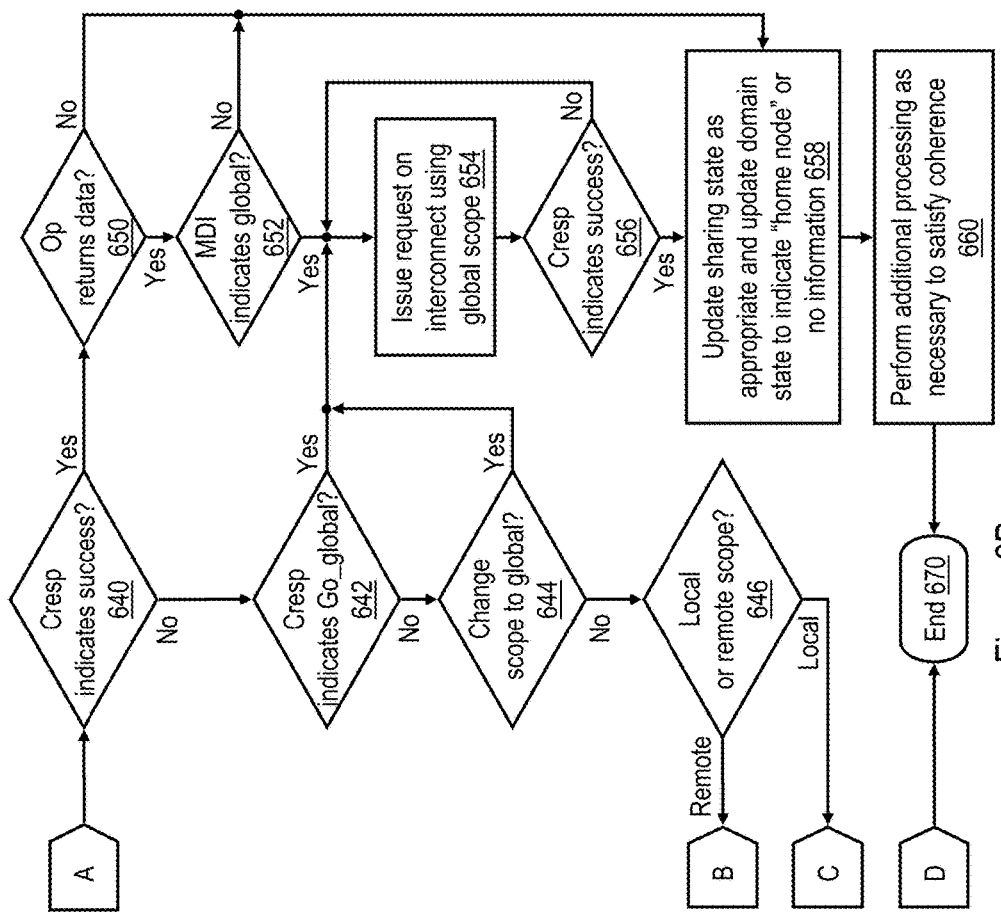

Referring first to FIGS. 6A-6B together depict a high level logical flowchart of an exemplary process by which a lower level cache memory (e.g., L2 cache 230) issues memory access requests on the interconnect fabric of data processing system 100 using various broadcast scopes in accordance with one embodiment. The illustrated process begins at block 600 and then proceeds to block 602, which illustrates an L2 cache 230 determining whether it has received a memory access request from the associated processor core 200. If not, the process iterates at block 602 until the L2 cache 230 receives a memory access request from the associated processor core 200.

In response to L2 cache 230 receiving a memory access request from the associated processor core 200, the process proceeds from block 602 to block 604, which illustrates L2 cache 230 determining whether or not it is able to resolve the memory access request without issuing an interconnect operation on the interconnect fabric. For example, the determination depicted at block 604 can be made based on the type of the memory access request and the cache state in L2 directory 238 associated with the target real address of the memory access request. In response to an affirmative determination at block 604, the L2 cache 230 allocates an RC machine 232 to service the core memory access request (block 606). In servicing the request, the RC machine 232 may employ conventional processing, for example, providing requested data to the processor core 200, updating a target cache line (e.g., held in L2 cache 230 in a Modified cache state), etc. Following block 606, the process passes through page connector D to FIG. 6B and ends at block 670.

In response to a determination at block 604 that L2 cache 230 is not able to completely resolve the core memory access request without issuing an interconnect operation, the process proceeds to block 608-610, which illustrate L2 cache 230 casting out a cache line resident in L2 array 234 if doing so is required to service the memory access request of the associated processor core (e.g., if a modified cache line must be replaced with a cache mapping to the same congruence class). The process then proceeds to blocks 620-630, which together illustrate an exemplary technique by which an RC machine 232 selects an initial scope of broadcast of an interconnect operation utilized to service the core request. In this embodiment, the RC machine 232 selects between a broadcast of either a remote scope or of a local scope (as defined above), and failing to resolve the request with the initial scope, follows up with a subsequent broadcast of global scope.

Turning now to block 620, the RC machine 232 allocated to service the core memory access request determines whether or not scope predict logic 235 indicates that a remote scope should be utilized for the initial broadcast of an interconnect request to service the core memory access request. As noted above, scope predict logic 235 may base a prediction of remote scope on, for example, the type of the memory access request, the target address of the memory access request, a scope history maintained in a data structure indicating success in resolving requests utilizing an initial broadcast of remote scope, and/or a cache state associated with the target address in L2 directory 238. In response to a determination at block 620 that a remote scope is predicted as the initial broadcast scope for the interconnection, the process passes to block 626, which illustrates RC machine 232 issuing an interconnect request corresponding to the core request utilizing the remote scope, meaning that the interconnect request is transmitted only within the local coherency domain (e.g., local processing node 102) and a selected remote coherency domain (e.g., a remote processing node 102), thus excluding one or more other coherence domains from the broadcast scope. The remote coherency domain 102 included in the scope of the broadcast of the interconnect operation is selected by NID logic 233, for example, based on historical information regarding the location of a data set referenced by the target real address of the memory access request, the location of the home node of the target real address, etc.

As indicated by block 622, the RC machine 232 also employs a remote scope for the initial broadcast of the interconnect request as shown at block 626 if the instruction executed by the processor core 200 to generate the core request explicitly specified use of a remote scope if an interconnect request were required to resolve the request. Block 624 further indicates that RC machine 232 employs a remote scope for the initial broadcast of the interconnect request at block 626 if NID logic 233 indicates that the request can be resolved utilizing a remote scope of broadcast (e.g., the LPC of the target request resides in a remote processing node 102). If RC machine 232 makes negative determinations at each of blocks 620, 622 and 624, RC machine 232 instead issues an initial broadcast of the interconnect request utilizing a local scope including only the local coherency domain (e.g., only the local processing node 102), as shown in block 630. Following either block 626 or block 630, the process proceeds through page connector A to block 640 of FIG. 6B.

Block 640 illustrates the RC machine 232 determining whether or not the combined response received for the interconnect operation indicates Success, as described below at blocks 1004 and 1014 of FIG. 10. If so, the process proceeds to block 650, which is described below. If, however, the RC machine 232 determines at block 640 that the combined response returned for the initial broadcast of the interconnect request does not indicate Success, RC machine 232 determines whether or not to modify the scope of broadcast. Although other modifications of broadcast scope are possible and contemplated, in the depicted embodiment, RC machine 232 either retains the initial scope of broadcast or devolves to a global scope of broadcast. For example, in the illustrated embodiment, RC machine 232 changes from the initial local or remote scope of broadcast to a global scope of broadcast if the combined response explicitly indicates to do so, as shown at block 642 (e.g., the combined response is Go_global, as described below with reference to block 1012 of FIG. 10), or if RC machine 232 determines to do so, as shown at block 644. RC machine 232 may also determine to change from the initial scope of broadcast to a global scope at block 644, for example, if the initial scope of broadcast has been attempted for a predetermined number of times (e.g., two) without success. In response to a determination at either block 642 or block 644 to change to a global broadcast scope, the process passes to block 654, which is described below. As indicated at block 646, if RC machine 232 makes negative determinations at blocks 642 and 644, RC machine 232 will re-issue the interconnect request utilizing the same scope as was utilized for the initial broadcast. Accordingly, the process returns through page connector B to block 626 of FIG. 6A if the initial scope of broadcast was a remote scope and returns through page connector C to block 630 of FIG. 6A if the initial scope of broadcast was a local scope.

Referring now to block 650, in response to receipt of a combined response indicating Success, RC machine 232 determines whether or not the interconnect request is expected to return a target cache line of data to the requesting L2 cache 230. If not, the process passes to block 658, which is described below. If, however, the interconnect request is expected to return a target cache line of data to the requesting L2 cache 230, the RC machine 232 awaits receipt of the target cache line of data. When it is received, RC machine 232 determines at block 652 whether the target cache line of data was received from a memory controller 206 and contains an MDI 504 that is reset to indicate "global." If not, meaning that the copy of the target cache line was received from another L2 cache 230 or was received from a memory controller 206 and had the MDI 504 set to indicate "local," the process passes to block 658, which is described below.

If, on the other hand, RC machine 232 determines at block 652 that the target cache line of data received in response to an interconnect request of local or remote scope was received from a memory controller 206 and contained an MDI 504 reset to indicate "global," the process proceeds to block 654. Block 654 depicts the RC machine 232 discarding any data received in response to the initial broadcast of the interconnect request and re-issuing the interconnect request on the interconnect fabric of data processing system 100 utilizing a global scope. At block 656, the RC machine 232 determines if the combined response of the interconnect request of global scope indicates success, as discussed below with reference to blocks 1108 and 1114 of FIG. 11. If not, the RC machine 232 reissues the interconnect request with a global scope, as indicated in FIG. 6B by the process returning to block 654. In response to receipt of a combined response indicating success of the interconnect request, the process proceeds from block 656 to block 658.

Block 658 of FIG. 6B illustrates RC machine 232 updating the cache state associated with the target cache line of the interconnect request in L2 directory 238. In particular, RC machine 232 updates the sharing state as necessary and updates the domain state to indicate either that the target cache line is cached only in the home node or that the L2 cache 230 has no information regarding whether the target cache line is cached outside the home node. RC machine 232 may also perform additional processing as necessary to satisfy coherence (block 660), such as issuing one or more kill requests to invalidate other cached copies of the target cache line. Further, if a scope history is maintained for purposes of scope prediction at block 620, RC machine 232 may also update the scope history at block 660 to indicate the success/failure of utilizing a local or remote scope to service the request. Following block 660, the process of FIG. 6B ends at block 670.

Figure 7:
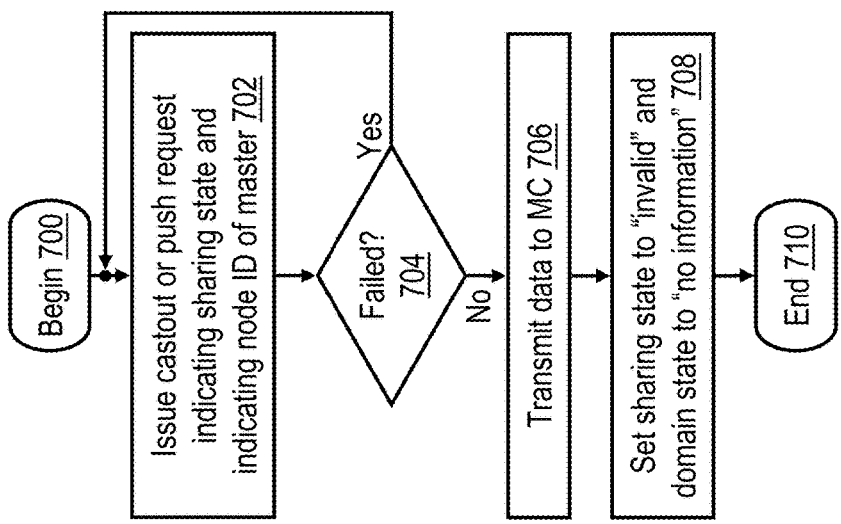
FIG. 7 is a high level logical flowchart of an exemplary process by which a processing unit of a data processing system performs a castout or push operation in accordance with one embodiment.

With reference now to FIG. 7, there is illustrated a high level logical flowchart of an exemplary process by which a processing unit 102 of data processing system 100 performs a castout or push operation in accordance with one embodiment. The process can be performed, for example, at block 610 of FIG. 6A or block 828 of FIG. 8B in order to write back a modified copy of a target cache line to its home system memory 108. Because the destination of castout or push operation is always a system memory 108, the operation is preferably not snooped by any caches in data processing system 100.

The process of FIG. 7 begins at block 700 and then proceeds to block 702, which illustrates an L2 cache 230 issuing a Castout or Push request on the interconnect fabric of data processing system 100. The Castout or Push request can initially be issued with a local scope, remote scope, or global scope, as described above. In addition to the target real address of the cache line of data to be written into system memory 108, the request preferably includes information indicating the sharing state of the cache line (which can simply be the cache state that was associated with the target cache line in L2 directory 238 immediately previous to issuance of the castout request), as well as the node ID of the initiating L2 cache 230. The initiating L2 cache 230 then determines at block 704 whether or not the request failed, for example, whether the request received a Retry combined response, as described below with reference to block 1008 of FIG. 10 or block 1112 of FIG. 11. If so, the L2 cache 230 re-issues the castout or push request, possibly increasing the scope of broadcast, as indicated by the process returning to block 702.

If, however, the L2 cache 230 determines at block 704 that the Castout or Push request did not fail, the L2 cache 230 transmits the target cache line of the Castout or Push request to the memory controller 206 that controls the home system memory 108 (block 706). In addition, the master updates the cache state associated with the target real address in its L2 directory 238, such that the indicated sharing state is Invalid and the domain state indicates "no information" (block 708). Thereafter, the process of FIG. 7 ends at block 710.

Figure 8A:
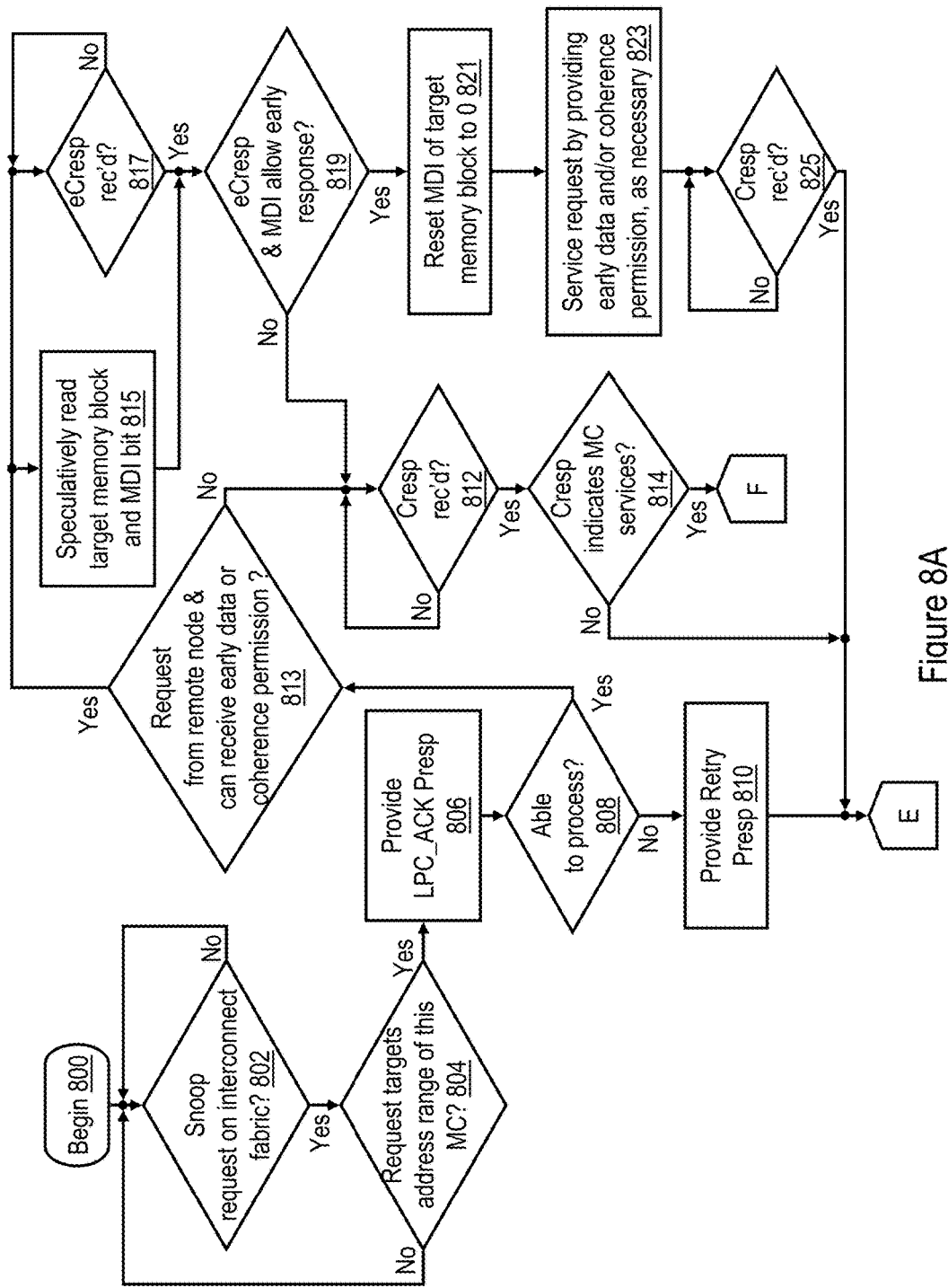
FIGS. 8A-8B together illustrate a high level logical flowchart of an exemplary process by which a memory controller handles a request snooped on the interconnect fabric of a data processing system in accordance with one embodiment.
Figure 8B:
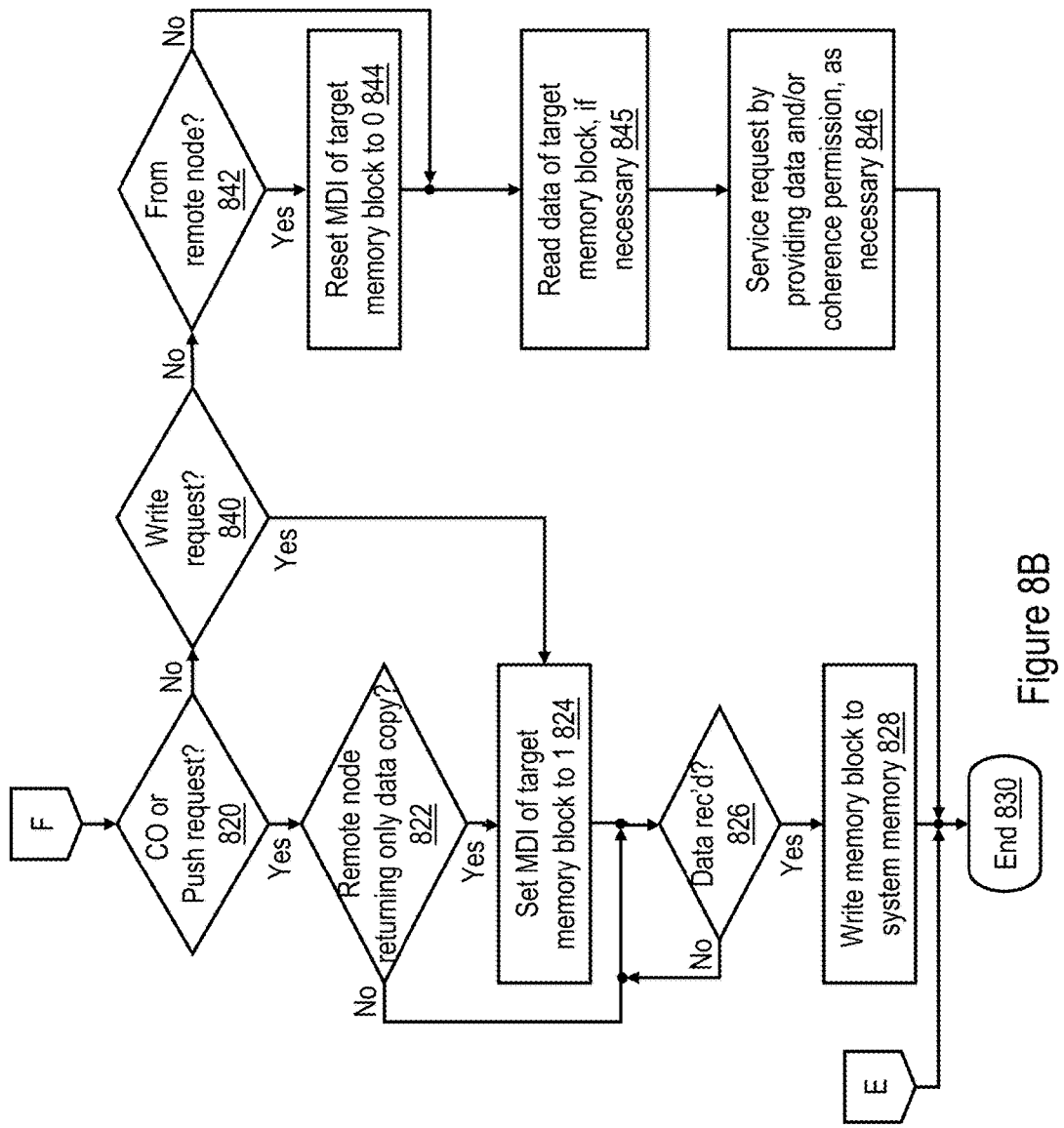

Referring now to FIGS. 8A-8B, there is depicted a high level logical flowchart of an exemplary process by which a memory controller 206 handles a memory access request snooped on the interconnect fabric of data processing system 100 in accordance with one embodiment. The illustrated process begins at block 800 and then proceeds to block 802, which illustrates memory controller 206 awaiting receipt of a memory access request on the interconnect fabric of data processing system 100. In response to snooping a memory access request on the interconnect fabric, memory controller 206 determines by reference to BAR logic 240 whether or not the target real address specified by the memory access request falls within the set of addresses it is responsible for servicing. If not, the process returns to block 802, which has been described.

If, however, memory controller 206 determines at block 804 that the target real address specified by the memory access request falls within the set of real addresses that are assigned to it, memory controller 206 provides an LPC_Ack partial response in order to indicate that the memory access request was received by the memory controller 206 assigned the target real address of the request (block 806). Memory controller 206 additionally determines at block 808 whether it is presently able to process the request, for example, if it has sufficient available resources (e.g., snoopers 222, queue entries, etc.) to service the request. In response to memory controller 206 determining that it presently is unable to process the request, memory controller 206 also provides a Retry partial response at block 810. Thereafter, the process passes through page connector E and terminates at block 830 of FIG. 8B.

Returning to block 808, in response to memory controller 206 determining that it is able to process the memory access request snooped on the interconnect fabric, memory controller 206 allocates a snooper 222 to service the memory access request, and the process passes to block 813. Block 813 illustrates snooper 222 determining whether the memory access request originated from a remote processing node 102 (e.g., whether the NID specified in the memory access request is that of a remote processing node 102) and whether the memory access request is of a type for which snooper 222 is permitted to provide early data or coherence permission (i.e., prior to receipt of the systemwide Cresp of the memory access request). For example, in one embodiment, snooper 222 may determine that the memory access request permits snooper 222 to provide early data and/or coherence permission if servicing of the memory access request by snooper 222 would require a read of the target memory block (e.g., a READ or RWITM) and does not permit snooper 222 to provide early data and/or coherence permission if servicing of the memory access request by snooper 222 would not require a read of the target memory block (e.g., DCBZ). In response to an affirmative determination at block 813, the process passes in parallel to blocks 815-817, which are described below. If, however, snooper 222 makes a negative determination at block 813, snooper 222 awaits receipt of the systemwide combined response for the memory access request, as shown at block 812. In response to receipt of the combined response, snooper 222 determines at block 814 whether or not the combined response indicates that the memory controller 206 is responsible for servicing the memory access request. If not, the process passes through page connector E and terminates at block 830 of FIG. 8B. If, however, the combined response indicates that the memory controller 206 is responsible for servicing the memory access request, the process passes through page connector F to blocks 820 and 840 of FIG. 8B.

Decision blocks 820 and 840 of FIG. 8B illustrate that the operations performed by snooper 222 to service the memory access request depend upon the type of the request. If the request is a Castout or Push request as discussed above with reference to FIG. 7, snooper 222 services the request as illustrated at block 822 and following blocks; if the request is a Write request, snooper 222 services the request as depicted at block 824 and following blocks; and if the request is other than a Castout, Push or Write request (e.g., a Read or RWITM request), snooper 222 services the request as indicated at block 842 and following blocks.

In response to a determination at block 820 that the request is a Castout or Push request, snooper 222 determines at block 822 whether the sharing state and node ID contained in the request indicate that the request originated from a remote processing node 102 and is returning the only cached copy of the target cache line to the home system memory 108. If not, the process passes to block 826. If so, snooper 222 sets the MDI 504 associated with the target memory block to 1 to indicate "local" (block 824). Snooper 222 then awaits receipt of the target cache line of data (block 826). In response to receipt of the target cache line of data, snooper 222 updates the corresponding memory block 500 and ECC 502 (block 828). Thereafter, the process of FIG. 8B ends at block 830.

Referring now to block 842, if the request is other than a Castout, Push, or Write request, snooper 222 determines from the node ID contained in the request if the request originated from another processing node 102. If not, the process passes from block 842 to block 845. If so, snooper 222 resets MDI 504 of the target memory block to 0 to indicate "global" (block 844). At block 845, snooper 222 reads the data of the target memory block 500 from memory 108, if necessary to service the request. In addition, at block 846, snooper 222 services the request by providing a copy of the target memory block 500 and/or coherence permission, as required by the request. Following block 846, the process of FIG. 8B ends at block 830.

Referring again to blocks 815-817 of FIG. 8A, in response to snooper 222 determining that the snooped memory access request originated from a remote processing node 102 and permits the snooper 222 to provide early data and/or coherence permission, snooper 222 speculatively reads the target memory block 500 and associated MDI bit 504 from its associated memory (block 815). In parallel, at block 817 snooper 222 also awaits receipt, via eCresp bus 422, of the eCresp for the memory access request, as described above with respect to FIG. 4B. Once the speculative read at block 815 has returned the target memory block 500 and MDI bit 504 and the eCresp has been received, snooper 222 determines from the eCresp and MDI bit 504 whether or not snooper 222 is permitted to provide an early (e.g., pre-Cresp) response to the memory access request (block 819).

As explained above, the eCresp received by snooper 222 at block 817 reflects the cache states for the target memory address that are present within the local processing node 102 of snooper 222. As explained above with respect to Table II, these cache states in turn indicate whether a local L2 cache 230 will take precedence over the IMC 206 in servicing the snooped memory access request and can additionally indicate whether another cache outside the local processing node 102 possibly holds a cache copy of the target memory block of the memory access request. In absence of a cache state (and thus the eCresp generated based on such a cache state) providing definite information regarding whether the target memory block is cached outside of the local processing node 102, the associated MDI bit 504 provides a definitive indication of whether or not the target memory block is cached outside of the local processing node 102. Thus, by considering both the eCresp and MDI bit 504 for the memory access request, snooper 222 can determine with certainty (1) whether a local L2 cache 230 will take precedence over snooper 222 in servicing the memory access request and (2) whether any remote processing node 102 may hold a cached copy of the target memory block (and thus prevents snooper 222 from servicing the memory access request by providing early data and/or coherence permission). If the eCresp and MDI bit 504 indicate that no local L2 cache 230 will take precedence over snooper 222 in servicing the memory access request and no remote processing node 102 holds a cached copy of the target memory block, snooper 222 determines at block 819 that it can provide early (i.e., pre-Cresp) data and/or coherence permission in response to the snooped memory access request.

In response to a negative determination at block 819, snooper 222 does not provide early data and/or coherence permission in response to the snooped memory access request, and the process of FIG. 8A passes to block 812 and following blocks, which have been described. If, however, snooper 222 makes an affirmative determination at block 819 that the eCresp of the memory access request and the MDI 504 of the target memory block permit snooper 222 to provide early data and/or coherence permission in response to the memory access request, snooper 222 resets MDI 504 of the target memory block to 0 to indicate "global" (block 821). In addition, at block 823, snooper 222 services the snooped memory access request by transmitting to the requesting master an early copy of the target memory block 500 and/or coherence permission, as required by the memory request. Thereafter, snooper 222 awaits receipt of the systemwide Cresp at block 825. In response to receipt of the systemwide Cresp, snooper 222 retires the tag used to track the memory access request, and the process passes through page connector E to end at block 830 of FIG. 8B. As noted above, by providing early data and/or coherence permission based on the local eCresp and MDI 504, snooper 222 reduces the latency experienced by the master of the memory access request by the interval between the completion of blocks 815 and 817 and the receipt of the systemwide Cresp at block 825.

Figure 9A:
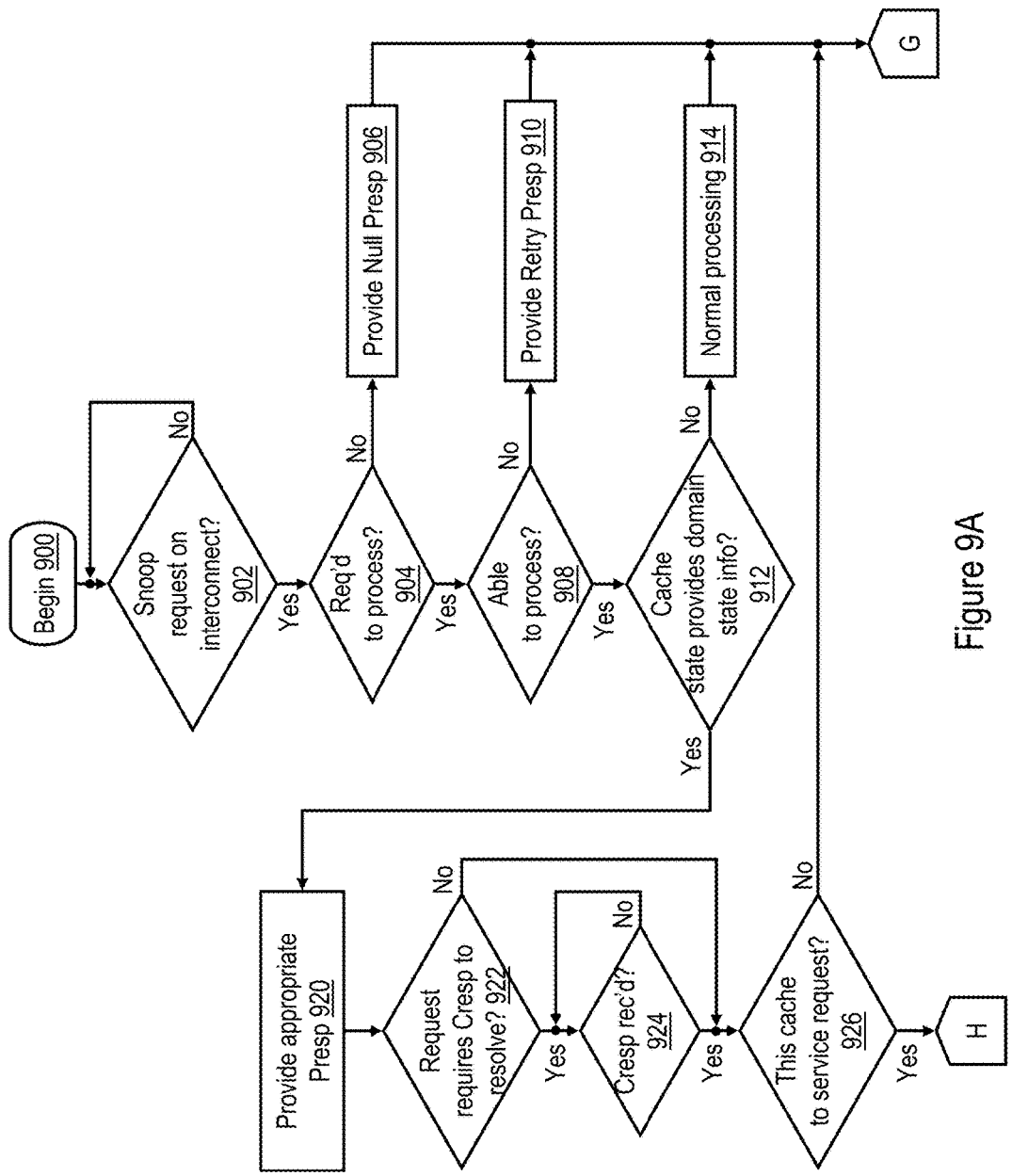

With reference now to FIGS. 9A-9B, there is illustrated a high level logical flowchart of an exemplary process by which a lower level cache memory (e.g., L2 cache 230) handles a request snooped on the interconnect fabric in accordance with one embodiment. The process of FIGS. 9A-9B begins at block 900 and then proceeds to block 902, which illustrates an L2 cache 230 awaiting receipt of a request snooped on the interconnect fabric. In response to receipt of a snooped request, L2 cache 230 determines at block 904 whether or not it is required to process the request. If not (e.g., the cache state for the target address is Invalid in the L2 directory 238), L2 cache 230 provides a Null partial response (which in some embodiments may be no partial response) (block 906). Thereafter, the process passes through page connector G and terminates at block 942 of FIG. 9B.

Returning to block 904, if a determination is made that the L2 cache 230 is required to process the snooped request, the process proceeds to block 908, which illustrates L2 cache 230 also determining whether or not L2 cache 230 is presently able to process the request. If not (e.g., no SN machine 236 is available for allocation to the request), L2 cache 230 provides a Retry partial response to the request (block 910). Thereafter, the process passes through page connector G and terminates at block 942 of FIG. 9B. If, however, L2 cache 230 determines at block 908 that it is able to process the snooped request, L2 cache 230 allocates an available SN machine 236 to service the request. The allocated SN machine 236 determines at block 912 whether or not the present cache state associated by L2 directory 238 with the target real address of the snooped request provides any domain state information (e.g., the cache state is in one of the Mx, Tx or Ig states). If not, SN machine 236 services the snooped request utilizing normal processing (block 914), which may include, for example, providing an appropriate partial response and thereafter providing the requesting master a copy of the target cache line and/or invalidating the copy of the target cache line held in L2 cache 230. Thereafter, the process passes through page connector G and terminates at block 942 of FIG. 9B.

In response to a determination at block 912 that the present cache state of the target cache line of the snooped request does provide domain state information (e.g., the cache state is in one of the Mx, Tx or Ig states), the process passes to block 920. Block 920 illustrates the allocated SN machine 236 providing an appropriate partial response based on, for example, the cache state of the target cache line in the associated L2 directory 238 and the type of the request. At block 922, the SN machine 236 further determines whether or not resolution of the request depends upon receipt of the combined response. If so, SN machine 236 awaits receipt of the combined response prior to performing further processing for the request at block 926 (block 924). If not, the process proceeds directly from block 922 to block 926, which depicts SN machine 236 determining whether it is responsible for servicing the request (e.g., is the HPC for the target cache line or is designated by the combined response as responsible for servicing the request). If not, the process passes through page connector G and terminates at block 942 of FIG. 9B. However, if SN machine 236 determines at block 926 that is responsible for servicing the snooped request, the process instead proceeds through page connector H to block 930 of FIG. 9B.

Block 930 of FIG. 9B illustrates SN machine 236 determining whether or not the snooped request is a Push request, which requests that the snooping L2 cache 230 holding a modified copy of the target cache line synchronize the corresponding memory block in system memory 108 with the updated data. If not, the process passes to block 934 and following blocks, which are described below. However, if SN machine 236 determines at block 930 that the snooped request is a Push request, SN machine 236 transmits a copy of the target cache line to the home system memory 108 and updates the relevant cache state in L2 directory 236, as described above with reference to FIG. 7 (block 932). The process thereafter ends at block 942 of FIG. 9B.

Referring now to block 934, SN machine 236 determines whether or not servicing the request requires transfer of a copy of the target cache line or transfer of coherence ownership of the target cache line (e.g., to another L2 cache 230). If not, SN machine 236 performs normal processing (e.g., invalidating the target cache line of a Kill request) as shown at block 935. Thereafter, the process ends at block 942. If, however, SN machine 236 determines at block 934 that servicing the snooped request requires transfer of a copy of the target cache line or transfer of coherence ownership of the target cache line, SN machine 236 transfers a copy of the target cache line and/or coherence ownership of the target cache line as required to service the snooped request and, if necessary, updates the relevant cache state in its L2 directory 238 to reflect the new sharing state (block 936). Blocks 938 and 940 further illustrate that, if the request originated from a processing node 102 other than the one containing the snooping L2 cache 230, the cache state to which SN machine 236 updates the entry in L2 directory 238 associated with the target cache line of the request also indicates, via its domain state, that the target cache line is cached in another processing node 102. Following either block 938 or block 940, the process of FIGS. 9A-9B ends at block 942.

Figure 10:
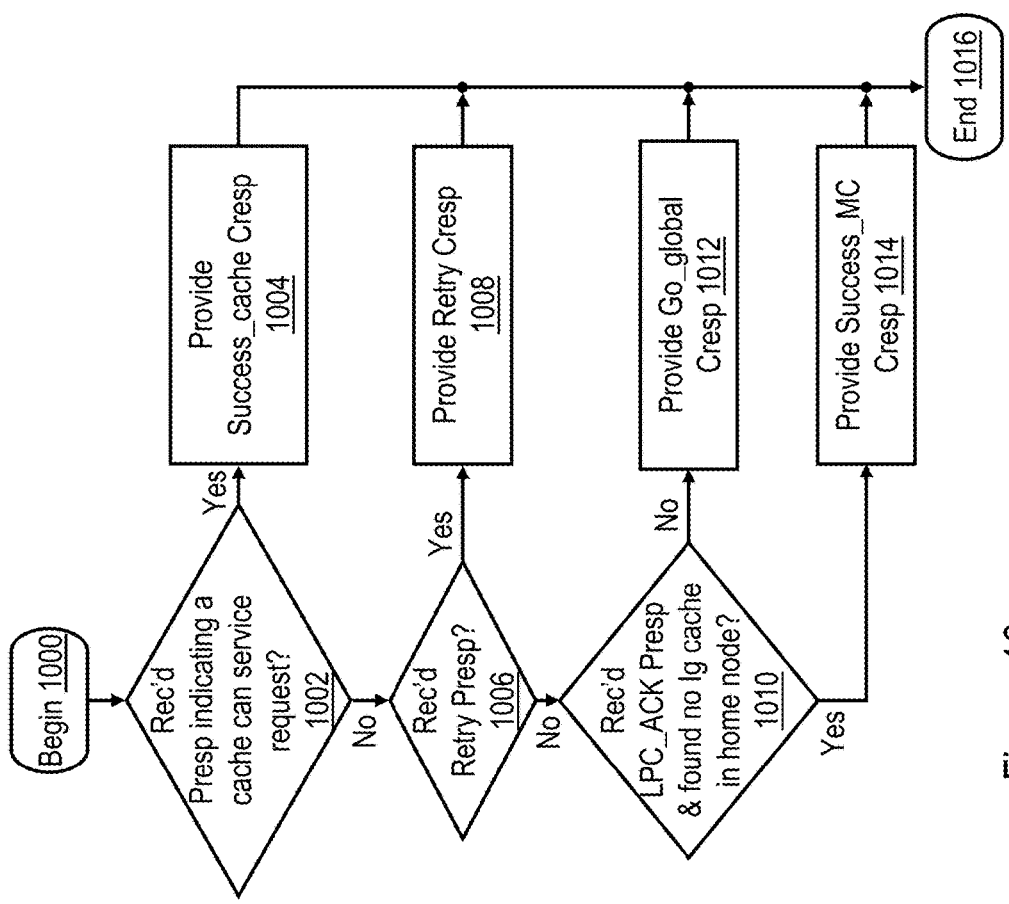
FIG. 10 is a high level logical flowchart of an exemplary process by which a combined response is determined for an interconnect operation of local or remote scope in accordance with one embodiment.

Referring now to FIG. 10, there is depicted a high level logical flowchart of an exemplary process by which a combined response is determined for an interconnect operation of local or remote scope in accordance with one embodiment. In one preferred embodiment, the combined response is determined by the instance of response logic 210 local to the master of the request from partial responses provided by snoopers 222, 236 in response to the request.

The process of FIG. 10 begins at block 1000 and then proceeds to block 1002, which illustrates response logic 210 determining whether a partial response was received indicating that an L2 cache 230 can service the request. If so, response logic 210 broadcasts a Success_cache combined response utilizing the same scope as used for the request (block 1004). The Success_cache combined response indicates that the request succeeded (as discussed above with reference to block 640 of FIG. 6B) and that a snooping L2 cache 230 is responsible for servicing the request (as discussed above with reference to block 926 of FIG. 9A).

If response logic 210 makes a negative determination at block 1002, meaning that no L2 cache 230 will be able to service the request, response logic 210 determines at block 1006 whether a Retry partial response was received from a snooper 222 or SN machine 236. If so, the request fails (as discussed above with reference to block 640 of FIG. 6B), and response logic 210 broadcasts a Retry combined response utilizing the same scope as used for the request (block 1008). As a result, the master will re-issue the request with either the same scope or with a global scope of broadcast.

If response logic 210 makes a negative determination at block 1006, response logic 210 determines at block 1010 whether (1) a LPC_Ack partial response (e.g., as discussed above with reference to block 806) was received, indicating that the memory controller 206 of the home system memory 108 received the request and (2) no L2 cache 230 in the home node holding the target cache line in an Ig state provided a partial response. If not, the initial scope of broadcast of the request did not include the home node of the target real address or a copy of the target memory block is cached outside of the home node. Accordingly, response logic 210 broadcasts a Go_global combined response utilizing the same scope as used for the request (block 1008). As noted above with reference to blocks 642 and 654, the Go_global combined response causes the master of the request to re-issue the request, which was initially issued with a local or remote scope, utilizing a broader global scope. In response to a determination at block 1010 that an LPC_Ack partial response was received and no Ig cache in the home node provided a partial response, response logic 210 broadcasts a Success_MC combined response utilizing the same scope as used for the request (block 1014). The Success_MC combined response indicates that the request succeeded (as discussed above with reference to block 640 of FIG. 6B) and that the memory controller 206 of the home system memory 108 is responsible for servicing the request (as discussed above with reference to block 814 of FIG. 8A). Following any of blocks 1004, 1008, 1012, or 1014, the process of FIG. 10 ends at block 1016.

Figure 11:
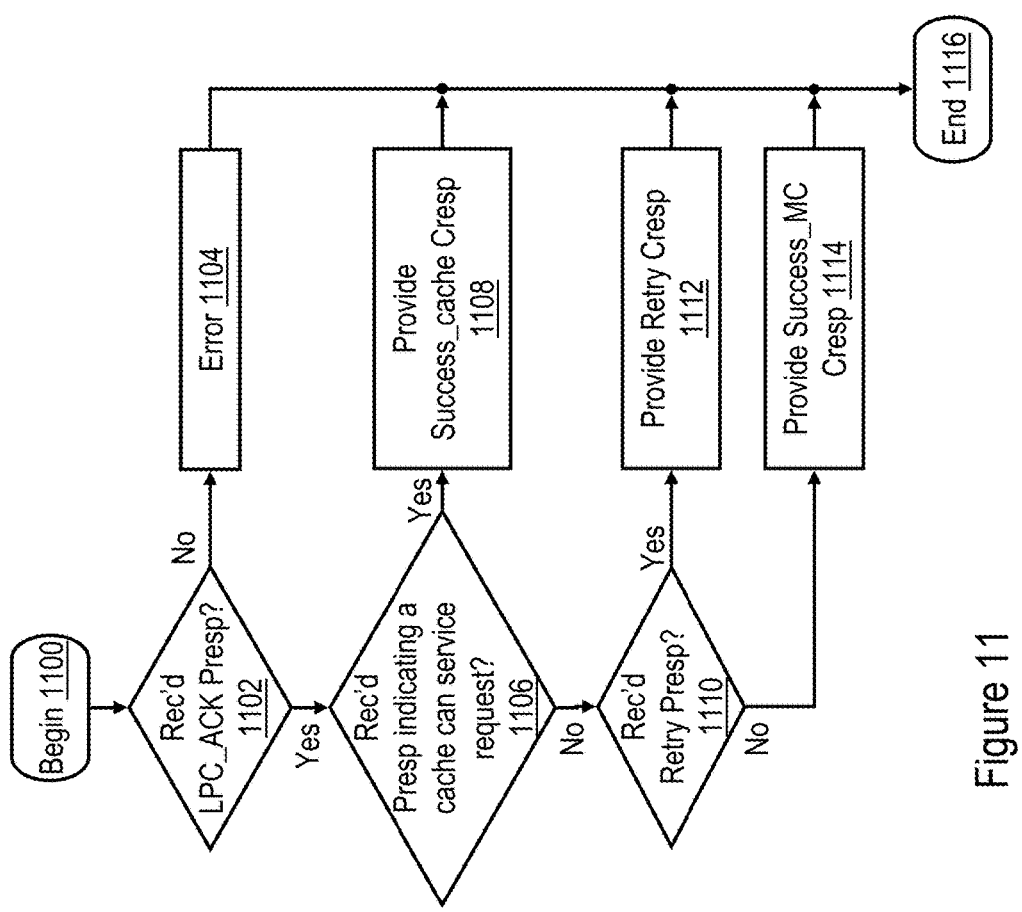
FIG. 11 is a high level logical flowchart of an exemplary process by which a combined response is determined for an interconnect operation of global scope in accordance with one embodiment.

With reference now to FIG. 11, there is illustrated a high level logical flowchart of an exemplary process by which a combined response is determined for an interconnect operation of global scope in accordance with one embodiment. As above, the combined response is preferably determined by the instance of response logic 210 local to the master of the request from partial responses provided by snoopers 222, 236 in response to the request.

The process of FIG. 11 begins at block 1100 and then proceeds to block 1102, which illustrates response logic 210 determining whether or not an LPC_Ack partial response was received, indicating that the memory controller 206 of the home system memory 108 received the request. If not, the target real address of the request is not allocated to any memory controller 206, and the interconnect operation terminates with an error (block 1104).

If response logic 210 determines at block 1102 that an LPC_Ack partial response was received, response logic 210 determines at block 1106 whether or not a partial response was received indicating that an L2 cache 230 can service the request. If so, response logic 210 broadcasts a Success_cache combined response utilizing the same global scope as used for the request (block 1108). The Success_cache combined response indicates that the request succeeded (as discussed above with reference to block 640 of FIG. 6B) and that a snooping L2 cache 230 is responsible for servicing the request (as discussed above with reference to block 926 of FIG. 9A).

If response logic 210 makes a negative determination at block 1106, meaning that no L2 cache 230 will be able to service the request, response logic 210 determines at block 1110 whether a Retry partial response was received from a snooper 222 or SN machine 236. If so, the request fails (as discussed above with reference to block 640 of FIG. 6B), and response logic 210 broadcasts a Retry combined response utilizing the same global scope as used for the request (block 1112). As a result, the master will re-issue the request with a global scope of broadcast.

In response to a determination at block 1110 that no Retry partial response was received, response logic 210 broadcasts a Success_MC combined response utilizing the same global scope as used for the request (block 1114). The Success_MC combined response indicates that the request succeeded (as discussed above with reference to block 656 of FIG. 6B) and that the memory controller 206 of the home system memory 108 is responsible for servicing the request (as discussed above with reference to block 814 of FIG. 8A). Following any of blocks 1104, 1108, 1112, or 1114, the process of FIG. 11 ends at block 1116.

Figure 12:
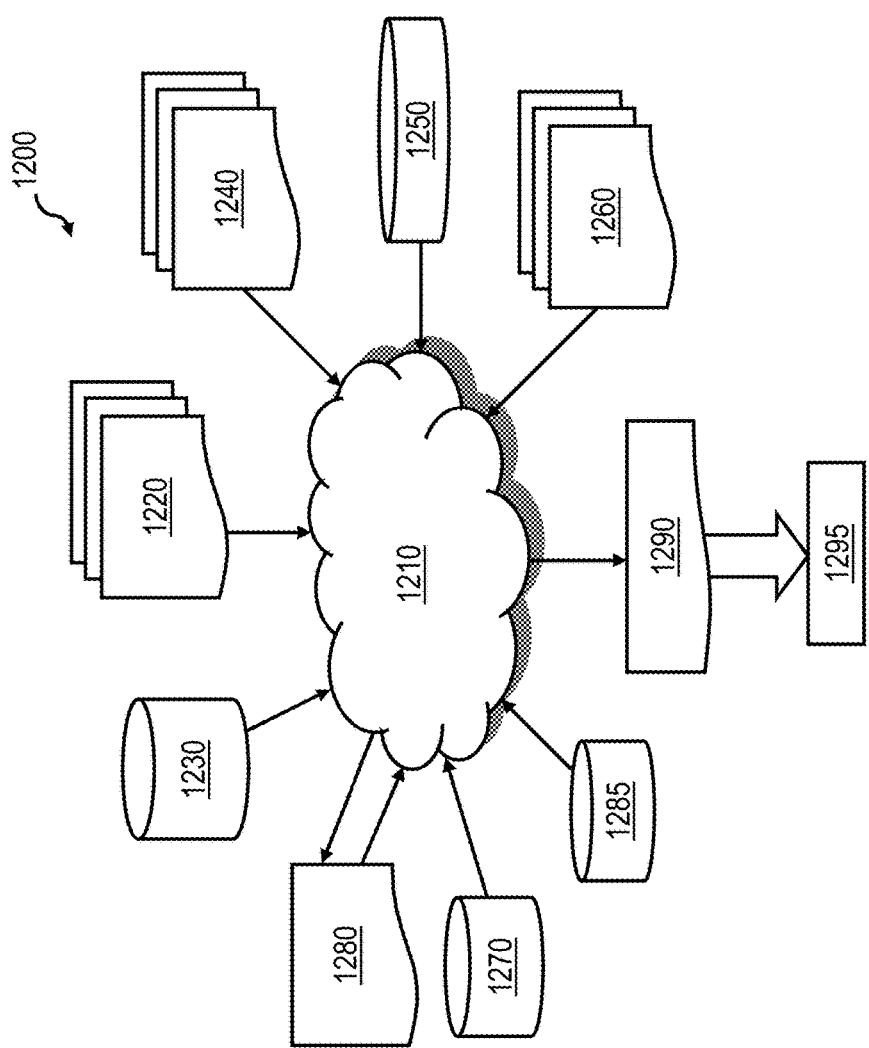
FIG. 12 depicts an exemplary design process in accordance with one embodiment.

Referring now to FIG. 12, there is depicted a block diagram of an exemplary design flow 1200 used for example, in semiconductor IC logic design, simulation, test, layout, and manufacture. Design flow 1200 includes processes, machines and/or mechanisms for processing design structures or devices to generate logically or otherwise functionally equivalent representations of the design structures and/or devices described above and shown herein. The design structures processed and/or generated by design flow 1200 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1200 may vary depending on the type of representation being designed. For example, a design flow 1200 for building an application specific IC (ASIC) may differ from a design flow 1200 for designing a standard component or from a design flow 1200 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 1020 that is preferably processed by a design process 1210. Design structure 1220 may be a logical simulation design structure generated and processed by design process 1210 to produce a logically equivalent functional representation of a hardware device. Design structure 1220 may also or alternatively comprise data and/or program instructions that when processed by design process 1210, generate a functional representation of the physical structure of a hardware device. Whether representing functional and/or structural design features, design structure 1220 may be generated using electronic computer-aided design (ECAD) such as implemented by a core developer/designer. When encoded on a machine-readable data transmission, gate array, or storage medium, design structure 1220 may be accessed and processed by one or more hardware and/or software modules within design process 1210 to simulate or otherwise functionally represent an electronic component, circuit, electronic or logic module, apparatus, device, or system such as those shown herein. As such, design structure 1220 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1210 preferably employs and incorporates hardware and/or software modules for synthesizing, translating, or otherwise processing a design/simulation functional equivalent of the components, circuits, devices, or logic structures shown herein to generate a netlist 1280 which may contain design structures such as design structure 1220. Netlist 1280 may comprise, for example, compiled or otherwise processed data structures representing a list of wires, discrete components, logic gates, control circuits, I/O devices, models, etc. that describes the connections to other elements and circuits in an integrated circuit design. Netlist 1280 may be synthesized using an iterative process in which netlist 1280 is resynthesized one or more times depending on design specifications and parameters for the device. As with other design structure types described herein, netlist 1280 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1210 may include hardware and software modules for processing a variety of input data structure types including netlist 1280. Such data structure types may reside, for example, within library elements 1230 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1240, characterization data 1250, verification data 1260, design rules 12120, and test data files 1285 which may include input test patterns, output test results, and other testing information. Design process 1210 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1210 without deviating from the scope and spirit of the invention. Design process 1210 may also include modules for performing standard circuit design processes such as timing analysis, verification, design rule checking, place and route operations, etc.

Design process 1210 employs and incorporates logic and physical design tools such as HDL compilers and simulation model build tools to process design structure 1220 together with some or all of the depicted supporting data structures along with any additional mechanical design or data (if applicable), to generate a second design structure 1290. Design structure 1290 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1220, design structure 1290 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1290 may comprise a compiled, executable HDL simulation model that functionally simulates the devices shown herein.

Design structure 1290 may also employ a data format used for the exchange of layout data of integrated circuits and/or symbolic data format (e.g., information stored in a GDSII (GDS2), GL1, OASIS, map files, or any other suitable format for storing such design data structures). Design structure 1290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1290 may then proceed to a stage 1295 where, for example, design structure 1290: proceeds to tape-out, is released to manufacturing, is released to a mask house, is sent to another design house, is sent back to the customer, etc.

As has been described, in at least one embodiment, a data processing system includes first and second coherency domains and employs a snoop-based coherence protocol. In response to receipt by the first coherency domain of a memory access request originating from a master in the second coherency domain, a plurality of coherence participants in the first coherency domain provides partial responses for the memory access request to an early combined response generator. Based on the partial responses, the early combined response generator generates and transmits, to a memory controller of a system memory in the first coherency domain, an early combined response of only the first coherency domain. Based on the early combined response, the memory controller transmits, to the master prior to receipt by the memory controller of a systemwide combined response for the memory access request, data associated with a target memory address and/or coherence permission for the target memory address.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a cache coherent data processing system including at least non-overlapping first and second coherency domains employing a snoop-based coherence protocol, said method comprising: in response to receipt by the first coherency domain of a memory access request originating from a master in the second coherency domain, the memory access request specifying a target memory address, a plurality of coherence participants in the first coherency domain providing partial responses for the memory access request to an early combined response generator; based on the partial responses, the early combined response generator generating and transmitting, to a memory controller of a system memory in the first coherency domain, an early combined response of only the first coherency domain; based on the early combined response, the memory controller servicing the memory access request by transmitting, to the master prior to receipt by the memory controller of a systemwide combined response for the memory access request, coherence permission for the target memory address; and thereafter, the memory controller receiving the systemwide combined response for the memory access request.

2. The method of claim 1, wherein the system memory is a home system memory of the target memory address of the memory access request.

3. The method of claim 1, further comprising:
maintaining in the system memory a memory domain indicator indicating whether a memory block identified by the target memory address is cached, if at all, only within the first coherency domain;
wherein the transmitting includes the memory controller transmitting based on both the early combined response and the memory domain indicator.

4. The method of claim 1, wherein the maintaining includes the memory controller, responsive to the memory access request, updating the memory domain indicator to indicate that the memory block identified by the target memory address is cached outside the first coherency domain.

5. The method of claim 1, further comprising:
while awaiting the early combined response, the memory controller speculatively reading a target memory block identified by the target memory address from the system memory.

6. The method of claim 1, wherein:
the memory access request is a first memory access request;
the systemwide combined response is a first systemwide combined response; and
the method further comprises the memory controller refraining from servicing a second memory access request prior to receipt of a second systemwide combined response for the second memory access request based on a request type specified by the second memory access request.

7. A cache coherent data processing system, comprising: at least non-overlapping first and second coherency domains employing a snoop-based coherence protocol, wherein the second coherency domain includes a master and the first coherency domain includes: a plurality of coherence participants that, in response to receipt of a memory access request originating from the master, the memory access request specifying a target memory address, provide partial responses for the memory access request; an early combined response generator that, based on the partial responses, generates and transmits an early combined response of only the first coherency domain; a system memory controlled by a memory controller, wherein the memory controller, based on the early combined response, services the memory access request by transmitting, to the master prior to receipt by the memory controller of a systemwide combined response for the memory access request, coherence permission for the target memory address.

8. The data processing system of claim 7, wherein the system memory is a home system memory of the target memory address of the memory access request.

9. The data processing system of claim 7, wherein:
the system memory includes a memory domain indicator indicating whether a memory block identified by the target memory address is cached, if at all, only within the first coherency domain;
the memory controller transmits at least one of a set including data associated with the target memory address and coherence permission for the target memory address based on both the early combined response and the memory domain indicator.

10. The data processing system of claim 7, wherein the memory controller, responsive to the memory access request, updates the memory domain indicator to indicate that the memory block identified by the target memory address is cached outside the first coherency domain.

11. The data processing system of claim 10, wherein the memory controller, while awaiting the early combined response, speculatively reads a target memory block identified by the target memory address from the system memory.

12. The data processing system of claim 7, wherein:
the memory access request is a first memory access request;
the systemwide combined response is a first systemwide combined response; and
the memory controller refrains from servicing a second memory access request prior to receipt of a second systemwide combined response for the second memory access request based on a request type specified by the second memory access request.

13. A memory controller for a cache coherent data processing system including at least non-overlapping first and second coherency domains employing a snoop-based coherence protocol, wherein the second coherency domain includes a master that issues a memory access request to the first coherency domain and the first coherency domain includes the memory controller and a system memory controlled by the memory controller, wherein the memory controller is configured to perform: receiving an early combined response for the memory access request that is generated in the first coherency domain based on partial responses of a plurality of coherence participants in the first coherency domain; and based on the early combined response, the memory controller servicing the memory access request by transmitting, to the master prior to receipt by the memory controller of a systemwide combined response for the memory access request, coherence permission for the target memory address.

14. The memory controller of claim 13, wherein the system memory is a home system memory of a target memory address of the memory access request.

15. The memory controller of claim 13, wherein:
the system memory includes a memory domain indicator indicating whether a memory block identified by the target memory address is cached, if at all, only within the first coherency domain; and
the memory controller is configured to transmit at least one of a set including data associated with the target memory address and coherence permission for the target memory address based on both the early combined response and the memory domain indicator.

16. The memory controller of claim 13, wherein the memory controller is configured to, responsive to the memory access request, update the memory domain indicator to indicate that the memory block identified by the target memory address is cached outside the first coherency domain.

17. The memory controller of claim 16, wherein the memory controller is configured to, while awaiting the early combined response, speculatively read from the system memory a target memory block of the memory access request.

18. The memory controller of claim 13, wherein:
the memory access request is a first memory access request;
the systemwide combined response is a first systemwide combined response; and the memory controller is configured to refrain from servicing a second memory access request prior to receipt of a second systemwide combined response for the second memory access request based on a request type specified by the second memory access request.

* * * * *